United States Patent
Arakawa et al.

(10) Patent No.: US 12,307,006 B2
(45) Date of Patent: May 20, 2025

(54) EGOCENTRIC HUMAN BODY POSE TRACKING

(71) Applicant: Snap Inc., Santa Monica, CA (US)

(72) Inventors: Riku Arakawa, New York, NY (US); Gurunandan Krishnan Gorumkonda, Kirkland, WA (US); Shree K. Nayar, New York, NY (US); Bing Zhou, Rye, NY (US)

(73) Assignee: SNAP INC., Santa Monica, CA (US)

(*) Notice: Subject to any disclaimer, the term of this patent is extended or adjusted under 35 U.S.C. 154(b) by 0 days.

(21) Appl. No.: 18/368,427

(22) Filed: Sep. 14, 2023

(65) Prior Publication Data

US 2024/0103610 A1 Mar. 28, 2024

Related U.S. Application Data

(60) Provisional application No. 63/375,811, filed on Sep. 15, 2022.

(51) Int. Cl.
*G06F 3/01* (2006.01)
*G06F 3/0346* (2013.01)
*G06T 17/00* (2006.01)

(52) U.S. Cl.
CPC ............ *G06F 3/012* (2013.01); *G06F 3/0346* (2013.01); *G06T 17/00* (2013.01)

(58) Field of Classification Search
CPC ......... G06F 3/011; G06F 3/012; G06F 3/0346
See application file for complete search history.

(56) References Cited

U.S. PATENT DOCUMENTS

| | | | |
|---|---|---|---|
| 2010/0277470 A1* | 11/2010 | Margolis | G06T 7/251 348/135 |
| 2016/0091965 A1* | 3/2016 | Wang | G06F 3/014 345/156 |
| 2017/0184387 A1* | 6/2017 | Lefevre | H04W 52/0229 |
| 2018/0239144 A1 | 8/2018 | Woods et al. | |
| 2019/0242952 A1* | 8/2019 | Schneider | G06F 3/012 |

(Continued)

FOREIGN PATENT DOCUMENTS

WO WO-2024059206 A1 3/2024

OTHER PUBLICATIONS

"International Application Serial No. PCT/US2023/032755, International Search Report mailed Nov. 22, 2023", 4 pgs.

(Continued)

*Primary Examiner* — Liliana Cerullo
(74) *Attorney, Agent, or Firm* — SCHWEGMAN LUNDBERG & WOESSNER, P.A.

(57) ABSTRACT

A pose tracking system is provided. The pose tracking system includes an EMF tracking system having a user-worn head-mounted EMF source and one or more user-worn EMF tracking sensors attached to the wrists of the user. The EMF source is associated with a VIO tracking system such as AR glasses or the like. The pose tracking system determines a pose of the user's head and a ground plane using the VIO tracking system and a pose of the user's hands using the EMF tracking system to determine a full-body pose for the user. Metal interference with the EMF tracking system is minimized using an IMU mounted with the EMF tracking sensors. Long term drift in the IMU and the VIO tracking system are minimized using the EMF tracking system.

20 Claims, 16 Drawing Sheets

(56) References Cited

U.S. PATENT DOCUMENTS

| | | |
|---|---|---|
| 2019/0286232 A1 | 9/2019 | De Nardi et al. |
| 2020/0371584 A1 | 11/2020 | Zhao et al. |
| 2020/0400856 A1* | 12/2020 | Castleman ............ G06F 3/0346 |
| 2021/0350551 A1* | 11/2021 | Ohashi ...................... G06F 3/01 |
| 2022/0206566 A1* | 6/2022 | Senkal ...................... G06T 7/70 |
| 2023/0281938 A1* | 9/2023 | Yan .......................... G06F 3/014 |
| | | 345/633 |
| 2023/0326135 A1* | 10/2023 | Cashman ................ G06F 3/017 |
| | | 345/419 |
| 2024/0029350 A1* | 1/2024 | Tu ............................ G06T 7/11 |

OTHER PUBLICATIONS

"International Application Serial No. PCT/US2023/032755, Written Opinion mailed Nov. 22, 2023", 7 pgs.

* cited by examiner

EGOCENTRIC HUMAN BODY POSE TRACKING

PRIORITY CLAIM

This application claims the benefit of priority of U.S. Provisional Patent Application No. 63/375,811, filed Sep. 15, 2022, which is hereby incorporated by reference herein in its entirety.

TECHNICAL FIELD

The present disclosure relates generally to augmented and virtual reality and more particularly to body pose detection.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the terms eXtended Reality "XR" and "AR" refer to augmented reality, virtual reality and any hybrids of these technologies unless the context indicates otherwise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
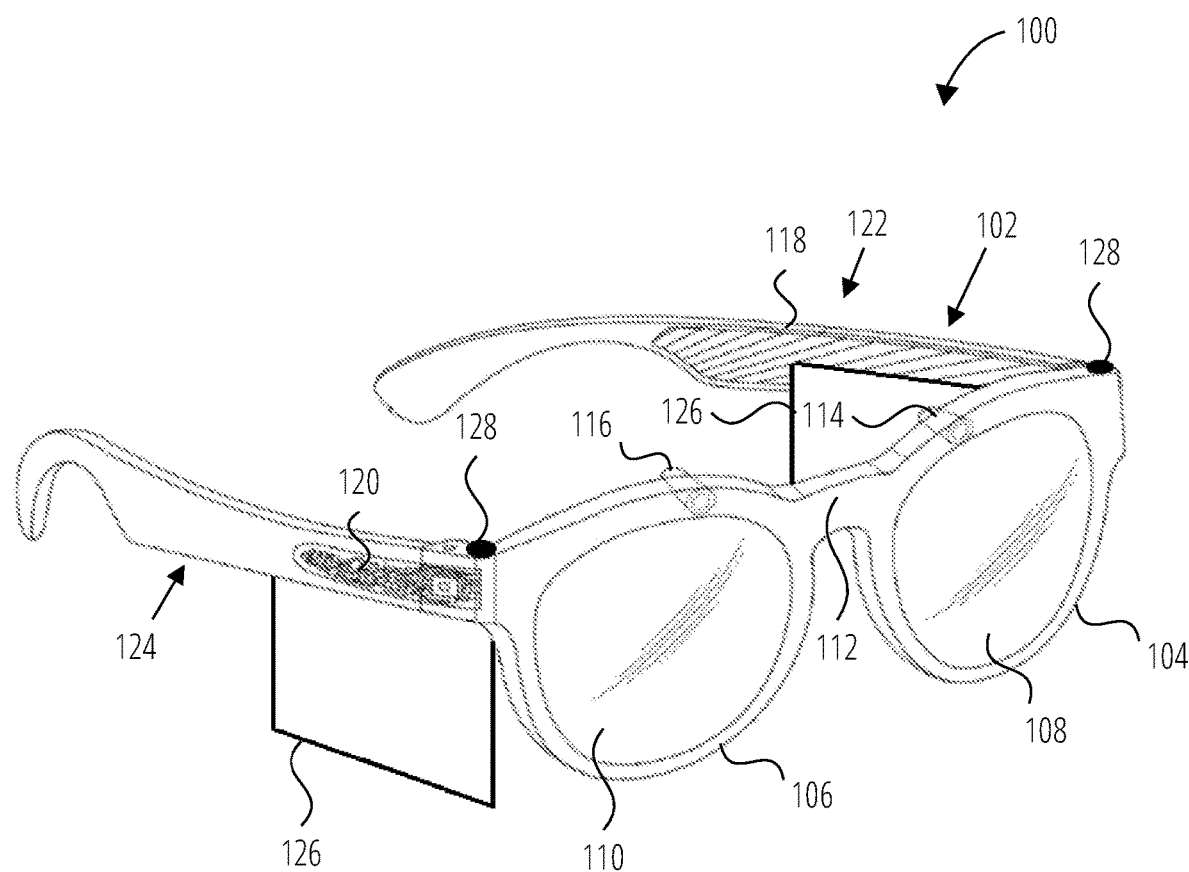
FIG. 1 is a perspective view of a head-worn device, in accordance with some examples.

Human body pose tracking through wearable sensors has great potential in XR applications, for instance, remote communication using 3D avatars with full-body expressions. Some pose tracking system use vision-based methods with hand-held controllers, limiting natural body-centered interactions such as hands-free movements and vision-based systems may be robust to full or partial occlusion of an image sensor, while other pose tracking system using body-worn Inertial Measurement Unit (IMU) sensors fail because of insufficient accuracy.

Human motion tracking can be used for various human computer interaction applications, especially in XR. Some devices use cameras embedded in head-mounted displays to track a user's head pose and two hand-held controllers in world coordinates for spatial input. These inputs give sparse information of the body pose, and may not be able to directly recover a full-body pose with more joints and degrees of freedom. This may detract from their usefulness when driving user avatars or designing full-body interactions in a virtual world. In addition, because of a limited camera field of view, controllers can be easily out of view and lose tracking, constraining users' interaction range. Additionally, users need to hold the controllers in both hands, which may hinder them from interacting with the virtual world with fingers. These constraints, i.e., the lack of finger freedom and complete body tracking, negatively impact the immersion and naturalness of the overall experiences in XR. Thus, an egocentric, hands-free and no-occlusion body tracking system is desirable.

In some examples, a pose tracking system includes an a head-worn XR system, such as AR glasses, and one or more wrist-mountable electromagnetic fields (EMF) tracking sensors. The pose tracking system achieves high-fidelity pose estimation using a trained deep neural network for inverse kinematics.

In some examples, the pose tracking system uses IMU data combined with the EMF sensor data to detect and correct for metal interference of the EMF tracking sensors, and improve tracking improvement of the EMF-IMU fusion approach to detecting and correcting interfered EMF tracking.

In some examples, a full-body pose tracking system includes magnetic tracking in the form of wristbands and a head-mounted display (HMD). In the pose tracking system, an electromagnetic field (EMF) source is combined with the visual-inertial-odometry (VIO) tracking of the HMD, and the pose tracking system is able to track 6 Degrees of Freedom (DoF) poses of three locations (head and two wrists). The pose tracking system reconstructs the body pose from these sparse signals using neural networks trained to recognize human poses using human pose inverse kinematics (IK). The neural networks are trained on a dataset to generate plausible body poses.

In some examples, a pose tracking system addresses an issue in magnetic tracking, i.e., metal interference, by leveraging an IMU sensor embedded together with the EMF sensor. The pose tracking system detects metal interference in real-time, and in addition, mitigates the influence by correcting the tracking through an EMF-IMU fusion approach.

In an example, performance of a pose tracking system is constructed for a high performance of body reconstruction and robustness against metal interference. Inverse Kinematic (IK) body models are trained (as more fully described in reference to FIG. 9 and FIG. 10) on a light-weight upper-body reconstruction model designed for resource constrained XR devices and a full-body reconstruction model which also enables more lower-body dynamics. The pose tracking system outperforms existing hand-held controller based approaches quantitatively.

In some examples, a pose tracking system provides the following features:
  A hands-free, occlusion-robust body pose tracking system with a single Head Mounted Display (HMD) and two EMF sensors on a user's wrists.
  Two inverse kinematics models: one light-weight model for upper-body only and one sophisticated model for full-body.
  To address issues in EMF tracking, i.e., metal interference, metal interference is detected and tracking failures are mitigated.
  EMF tracking data is used to correct long-term drift of a VIO tracking system and/or an Inertial Measurement Unit (IMU).

Other technical features may be readily apparent to one skilled in the art from the following figures, descriptions, and claims.

FIG. 1 is a perspective view of a head-worn XR or AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the temple piece 122 or the temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 1202 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
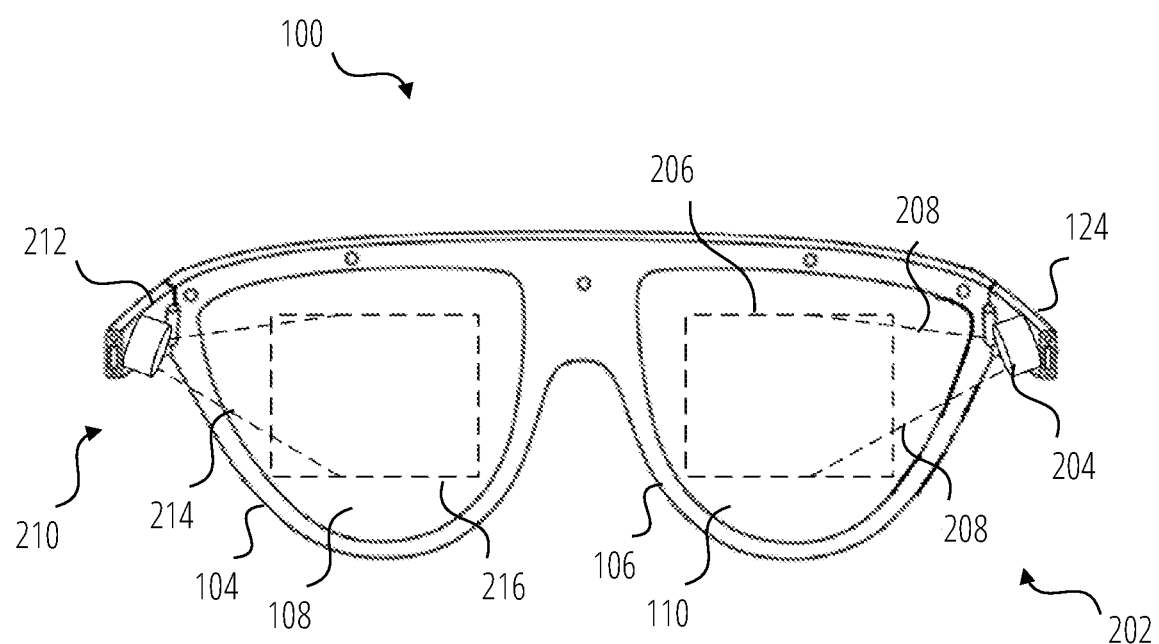
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 1226 illustrated in FIG. 12), and/or hand movements, locations, and positions detected by the glasses 100.

In some examples, the glasses 100 comprise a stand-alone XR or AR system that provides an XR or AR experience to a user of the glasses 100. In some examples, the glasses 100 are a component of an XR or AR system that includes one or more other devices providing additional computational resources and or additional user input and output resources. The other devices may comprise a smart phone, a general purpose computer, or the like.

Figure 3:
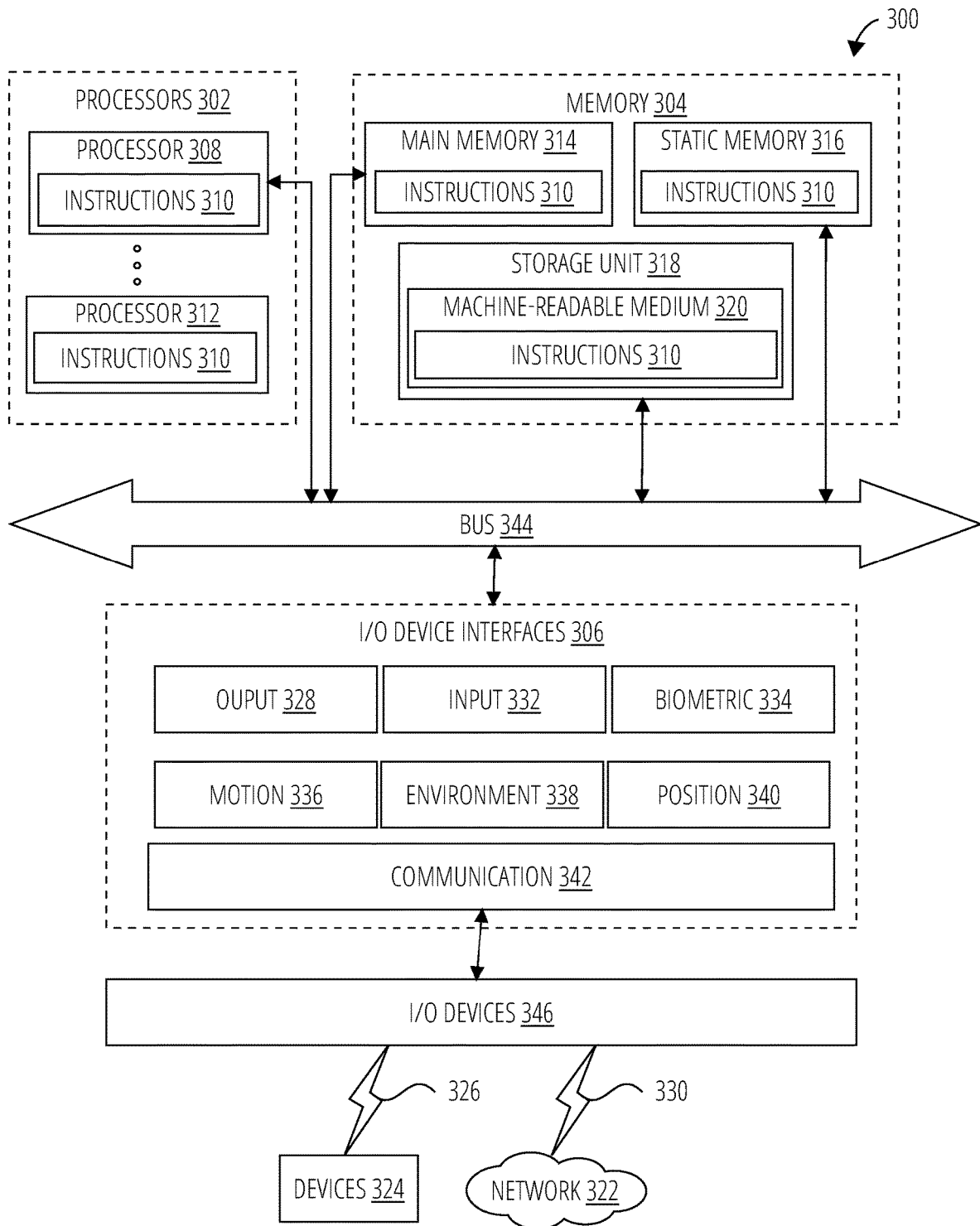
FIG. 3 is a diagrammatic representation of a machine within which a set of instructions may be executed for causing the machine to perform any one or more of the methodologies discussed herein, in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a computer 120 of an XR system in a form of an AR system such as glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 in conjunction with other components of the XR system may function as, but not is not limited to, a server, a client, computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O device interfaces 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within a non-transitory machine-readable medium 320 within the storage unit 318, within one or more of the processors 302 (e.g., within the processor's cache memory), or any suitable combination thereof, during execution thereof by the machine 300.

The I/O device interfaces 306 couple the machine 300 to I/O devices 346. One or more of the I/O devices 346 may be a component of machine 300 or may be separate devices. The I/O device interfaces 306 may include a wide variety of interfaces to the I/O devices 346 used by the machine 300 to receive input, provide output, produce output, transmit information, exchange information, capture measurements, and so on. The specific I/O device interfaces 306 that are included in a particular machine will depend on the type of machine. It will be appreciated that the I/O device interfaces 306 the I/O devices 346 may include many other components that are not shown in FIG. 3. In various examples, the I/O device interfaces 306 may include output component interfaces 328 and input component interfaces 332. The output component interfaces 328 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 332 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 306 may include biometric component interfaces 334, motion component interfaces 336, environmental component interfaces 338, or position component interfaces 340, among a wide array of other component interfaces. For example, the biometric component interfaces 334 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components are captured and stored in a temporary cache only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion component interfaces 336 may include interfaces to inertial measurement units (IMUs), acceleration sensor components (e.g., accelerometer), gravitation sensor components, rotation sensor components (e.g., gyroscope), and so forth. The environmental component interfaces 338 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position component interfaces 340 include interfaces to location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 306 further include communication component interfaces 342 operable to couple the machine 300 to a network 322 or devices 324 via a coupling 330 and a coupling 326, respectively. For example, the communication component interfaces 342 may include an interface to a network interface component or another suitable device to interface with the network 322. In further examples, the communication component interfaces 342 may include interfaces to wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 324 may be another machine or any of a wide variety of peripheral devices (e.g., a peripheral device coupled via a USB).

Moreover, the communication component interfaces 342 may include interfaces to components operable to detect identifiers. For example, the communication component interfaces 342 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication component interfaces 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
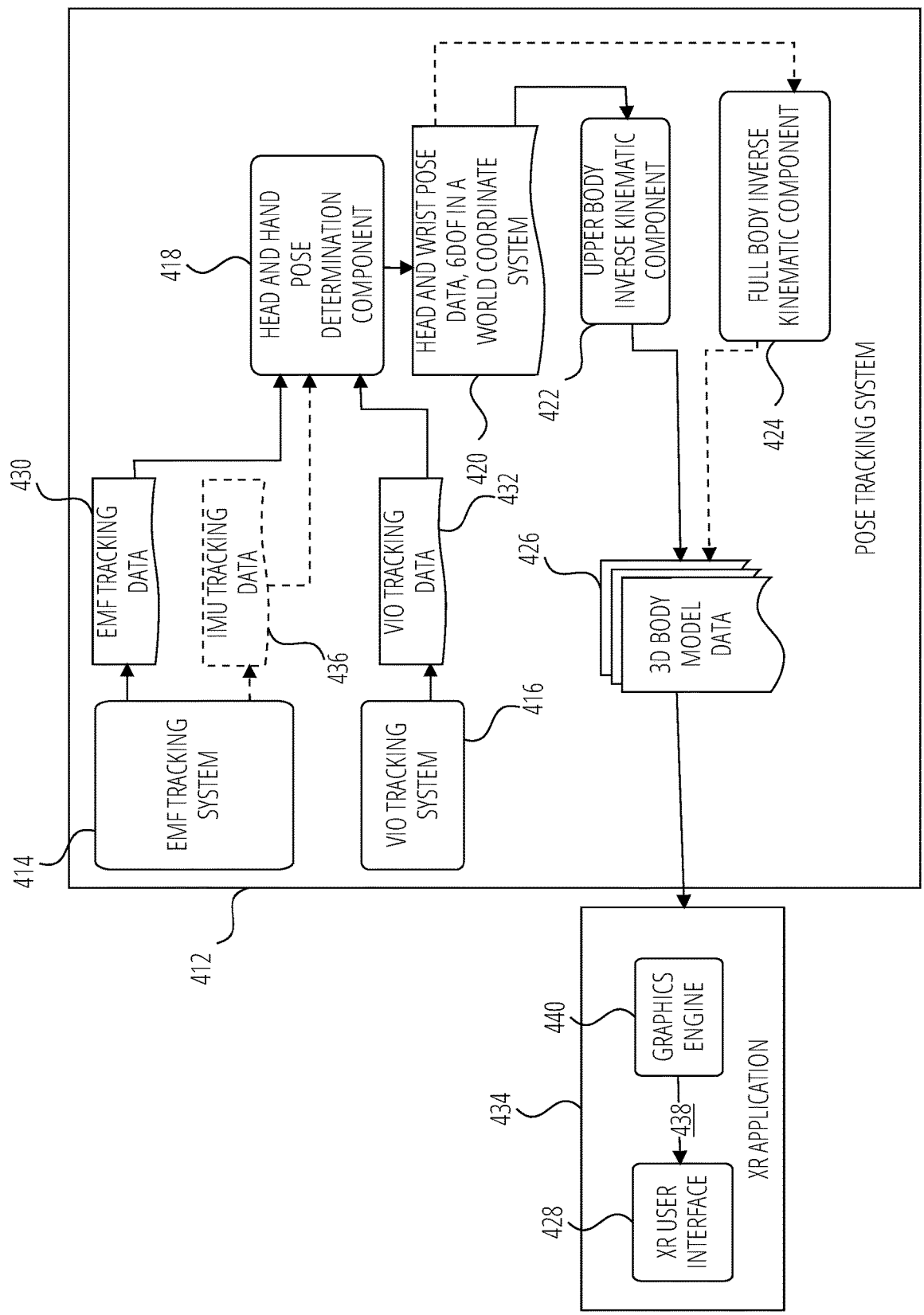
FIG. 4A and FIG. 4B are illustrations of components a pose tracking system, in accordance with some examples.
Figure 4B:
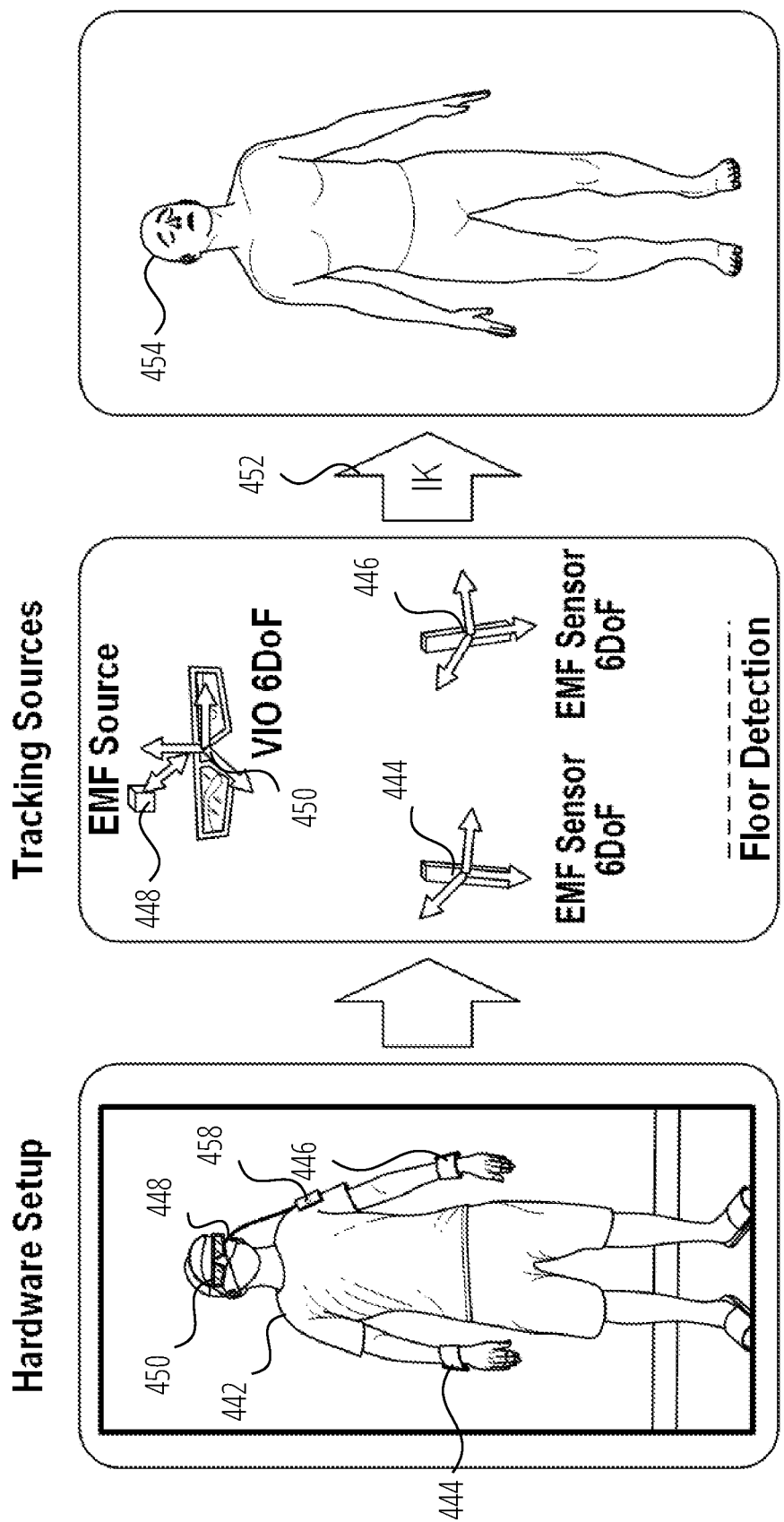

FIG. 4A and FIG. 4B are illustrations of components a pose tracking system in accordance with some examples of the present disclosure. A user 442 wears one or more EMF tracking sensors, such as EMF tracking sensor 444 and one or more wrist-mountable EMF tracking sensors, such as EMF tracking sensor 446 and EMF tracking sensor 444, on one or more wrists of the user 442 and a head-mounted EMF source 448. The EMF source 448 and the one or more EMF tracking sensors comprise components of an EMF tracking system 414 of a pose tracking system 412. The EMF tracking system 414 generates EMF tracking data 430 that is communicated to a head and hand pose determination component 418 of the pose tracking system 412.

A Visual Inertial Odometry (VIO)-tracking system 416 of AR glasses 450 is in fixed relative pose to the EMF source 448, such that positions of the EMF tracking sensor 444 and EMF tracking sensor 446 are fixed in a known relative position to the VIO tracking system 416 coordinates. The VIO tracking system 416 tracks the head of the user 442 in world coordinates leveraging Visual-Inertial Odometry (VIO)-tracking data 432 generated by the AR glasses 450.

A head and hand pose determination component 418 of the pose tracking system 412 receives the EMF tracking data 430 and the VIO tracking data 432 and calculates head and wrist pose data in 6DoF in a world coordinate system 420. The calculated head and wrist pose data comprise an EMF pose in world coordinates based on a head pose determined from the VIO tracking data 432 received from the VIO tracking system 416 of the AR glasses and EMF tracking data 430 received from the EMF tracking system 414. One or more wrist poses are tracked by EMF-tracking which provides relative poses from wrists of the user 442 to the EMF source 448. By applying the transforms between the EMF source 448 in world coordinates and the relative wrist EMF source poses, wrist poses in world coordinates can be derived. Accordingly, the head and hand pose determination component 418 has absolute world transforms of head and two wrists as measurements.

An upper body inverse kinematic component 422 of the pose tracking system 412 receives the head and wrist pose data in 6DoF in a world coordinate system 420 and generates 3D body model data 426 of a reconstructed full-body pose 454 of the user 442 based on these sparse measurements using an inverse kinematics model 452 that is an upper-body inverse kinematics model. In some examples, a full body inverse kinematic component 424 of the pose tracking system 412 receives the head and wrist pose data in 6DoF in a world coordinate system 420 and generates 3D body model data 426 of a reconstructed full-body pose 454 of the user 442 based on these sparse measurements using an inverse kinematics model 452 that is a full-body inverse kinematics model.

The pose tracking system 412 communicates the 3D body model data 426 to an XR application 434. The XR application 434 receives the 3D body model data 426 and uses a graphics engine 440 to generate 3D body mesh rendering data 438 based on the 3D body model data 426. The XR application 434 generates or updates an XR user interface 428 of an XR experience for one or more users based on the 3D body mesh rendering data 438.

In some examples, the EMF source 448 and the one or more EMF tracking sensors communicate with a Head Mounted Display (HMD) of the AR glasses 450 through Bluetooth Low Energy using ESB (Enhanced ShockBurst) protocol for minimized latency.

In some examples, an EMF tracking system 414 of the EMF source 448 and the one or more EMF tracking sensors have 3D coils. The one or more EMF tracking sensors measure the EMF B-field signals from three orthogonal transmission coils from the source and calculate the relative position and rotation relative to the source. The fundamental physics for EMF tracking is the Faraday's law: when the sensor moves inside an alternating AC magnetic field generated from source coils, a voltage is generated following the equation below:

$$vx = kBs \cdot \hat{x} + n_x$$

where B is the magnetic field, $\hat{x}$ is the vector of the cross section of winding area, and $n_x$ is the noise. To track all the three axes, three coils are mounted orthogonal to each other for both source and sensor, and each source axis generates magnetic field at different frequencies for multiplexing. In some examples, the EMF tracking system has a range of 1.5 meters (typical arm reach) with a position RMS error of 0.9 mm and angle RMS error of 0.5 degrees at 1 meter range.

In some examples, an IMU sensor is integrated in an EMF tracking sensor. The IMU sensor generates IMU tracking data 436 for the EMF tracking sensor and is used in a sensor-fusion approach to address metal interference issues with the EMF tracking system 414. The head and hand pose determination component 418 receives the IMU tracking data 436 and detects metal interference with the EMF tracking system 414 and substitutes the IMU tracking data 436 for the EMF tracking data 430 when calculating the head and wrist pose data in 6DoF in a world coordinate system 420 as further described in reference to FIG. 6 and FIG. 7.

In some examples, the EMF tracking system 414 operates at 442 frames per second (fps) with a latency of around 15 ms. In some examples, each EMF tracking sensor includes computational components that host executable components of a respective EMF tracking system and an EMF tracking algorithm runs locally on each EMF tracking sensor. In some examples, EMF tracking data 430 and IMU tracking data 436 data streams are synchronized. In some examples, the EMF tracking data 430 and IMU tracking data 436 and can be accessed from an external computation system via a Bluetooth connection.

In some examples, two tracking systems provide information for body pose reconstruction, such as the EMF tracking system 414 and the VIO tracking system 416. Multiple coordinate systems are defined as follows:

World Global Coordinates: The coordinates where the AR glasses 450 of the VIO tracking system 416 provide absolute positions $$P_g^W \in R^{1 \times 3}$$

and orientations in axis-angle representation $$\Phi_g^W \in R^{1 \times 3},$$

where g denotes glasses and W denotes world coordinates.

EMF Local Coordinates: The coordinates where wrist worn EMF tracking sensors are tracked relative to an EMF source 448 on the head of the user 442. Positions and rotations are represented as $$P\underset{s}{M} \in R^{1 \times 3} \text{ and } \Phi\underset{s}{M} \in R^{1 \times 3},$$

where s denotes sensor and M denotes EMF coordinates.

Body Local Coordinate: Human body pose can be represented by all the joints positions $$P\underset{j}{B} \in R^{1 \times 3}$$

and orientations $$\Phi\underset{j}{B} \in R^{1 \times 3}$$

in the body local coordinate, where j denotes body joints and B denotes body coordinate. A 3D body model is used to represent and animate the human body pose. The 3D body model takes the relative rotations of all the joints, determined using inverse kinematics, as input and outputs a 3D body mesh.

Figure 4C:
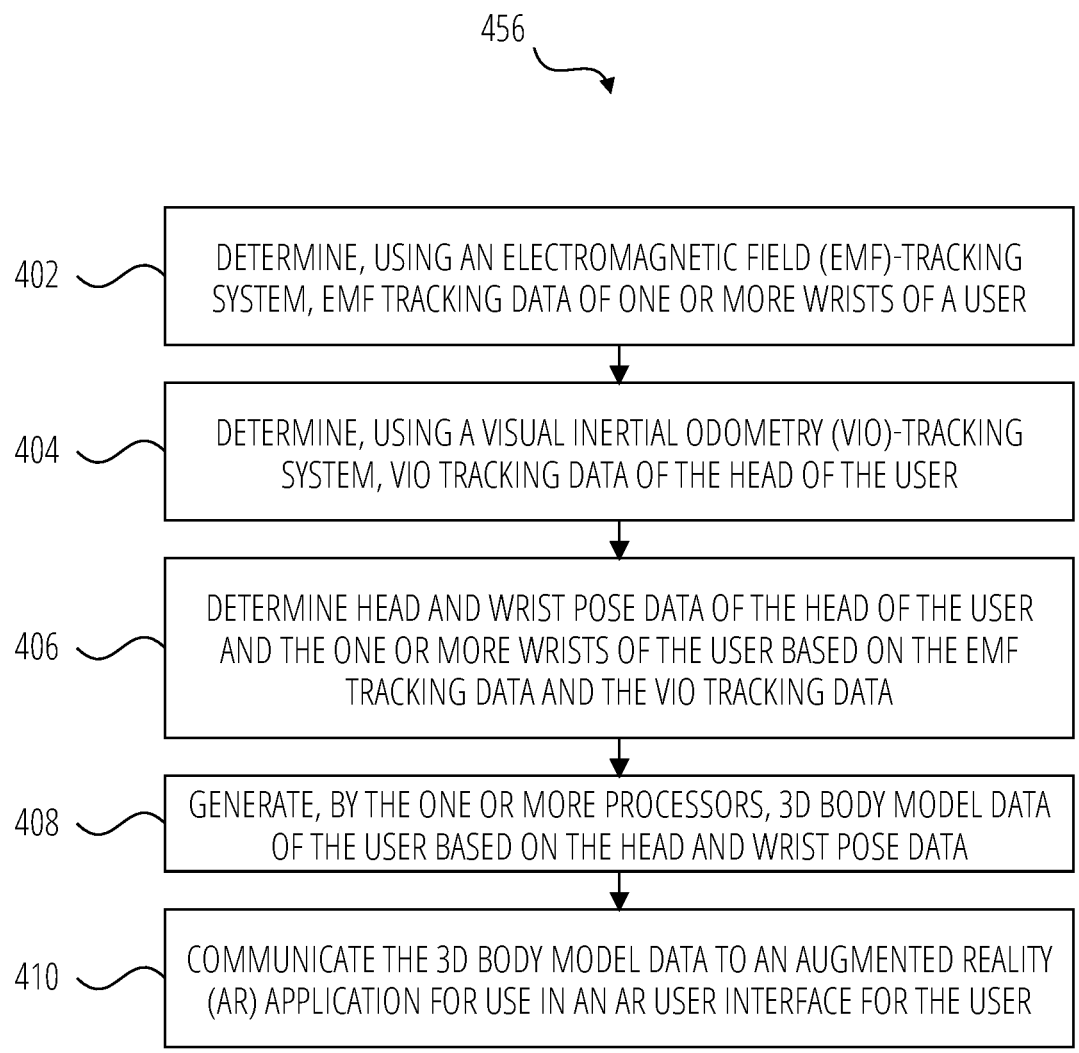
FIG. 4C is a pose tracking method of a pose tracking system, in accordance with some examples.

FIG. 4C is a pose tracking method 456 of a pose tracking system 412 in accordance with some examples of the present disclosure. In operation 402, the pose tracking system 412 determines, using the EMF tracking system 414, EMF tracking data 430 of one or more wrists of a user 442.

In operation 404, the pose tracking system 412 determines, using VIO tracking system 416, VIO tracking data 432 of the head of the user.

In operation 406, the pose tracking system 412 determines head and wrist pose data in 6DoF in a world coordinate system 420 of the head of the user 442 and the one or more wrists of the user 442 based on the EMF tracking data 430 and the VIO tracking data 432.

In operation 408, the pose tracking system 412 generates 3D body model data 426 of the user 442 based on the head and wrist pose data in 6DoF in a world coordinate system 420.

In operation 410, the pose tracking system 412 communicates the 3D body model data 426 to an XR application 434 for use in an XR experience provided by the XR application 434 to the user 442.

Figure 5A:
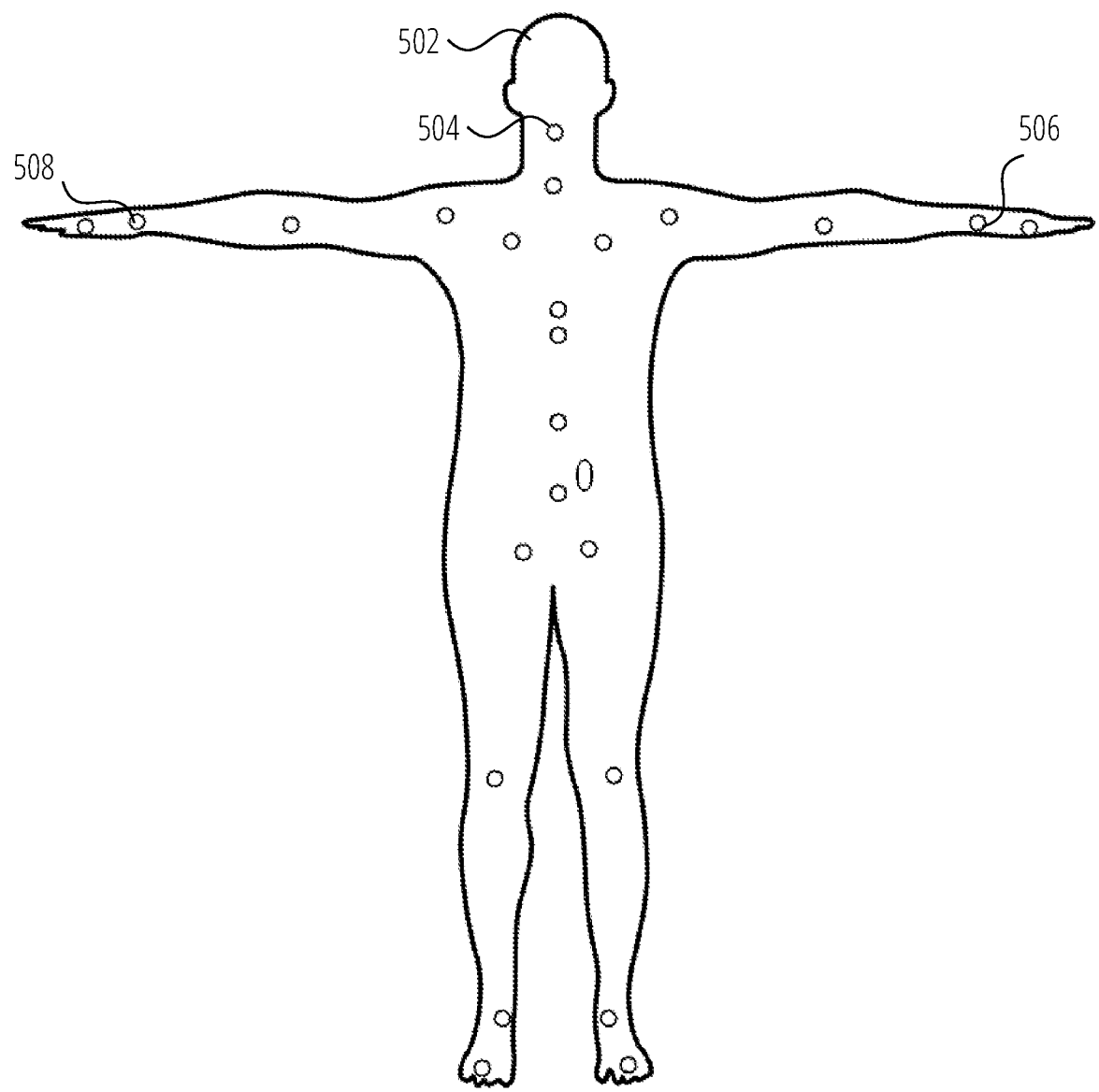
FIG. 5A is an illustration of a 3D body model and FIG. 5B is an illustration of a 3D body model generation process, in accordance with some examples.
Figure 5B:
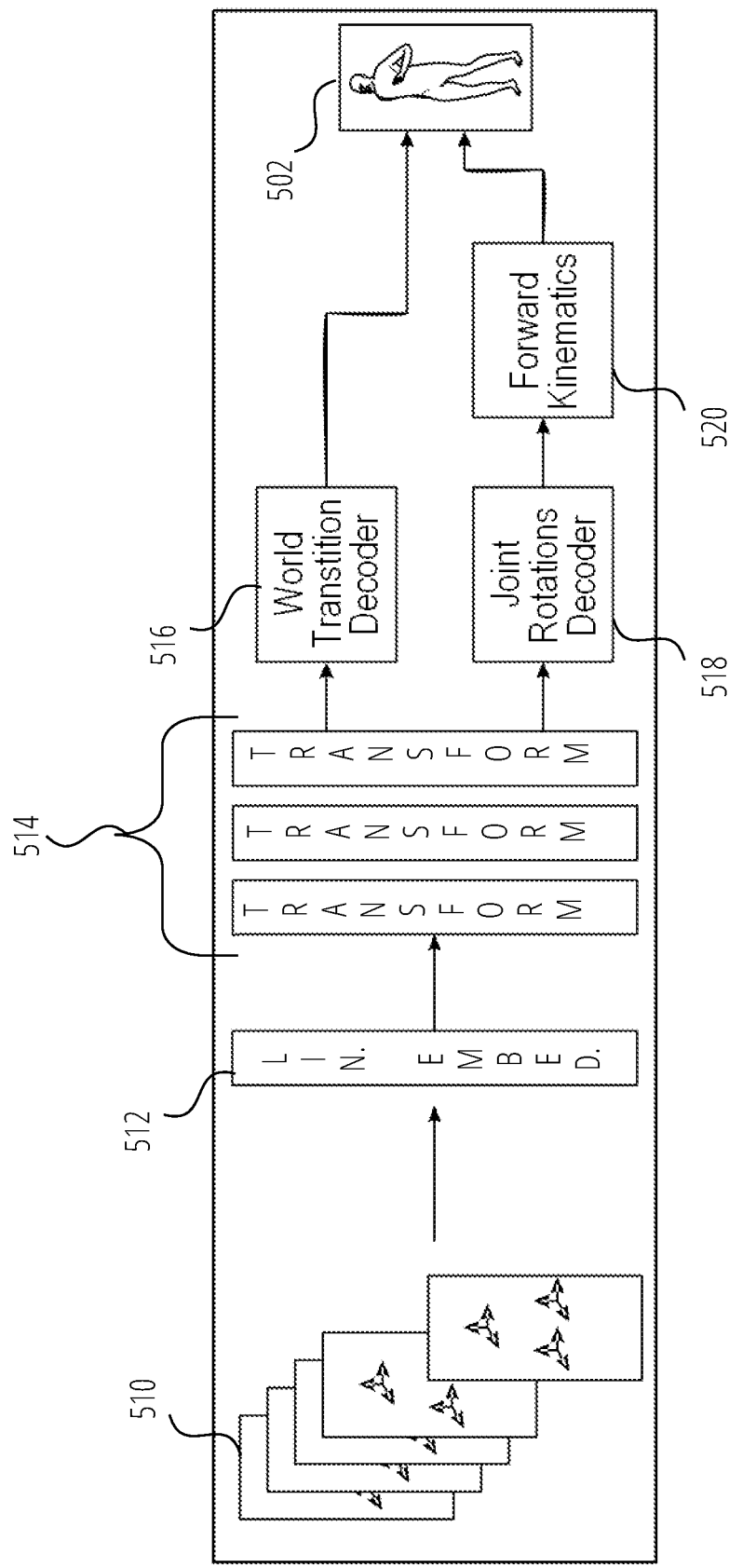

FIG. 5A is an illustration of a 3D body model 502 and FIG. 5B is an illustration of a 3D body model generation process in accordance with some examples of the present disclosure. In some examples, a SMPL 3D body model is used. The 3D body model 502 is a learned rigged template mesh with 6890 vertices to represent 3D body shape mesh. The body shape S defined by identity-dependent shape parameters β, pose parameters θ, soft deformation φ as the following equation: S (β, θ, φ)=G(T (β, θ, φ), J (β), θ, w) where T (β, θ, φ) represents the body vertices in a rest pose, $J \in R^{3k}$ denotes joint locations, $\theta \in R^{3k}$ denotes body pose (i.e., relative rotation angles between adjacent body joints) and $w \in R^{4 \times 3N}$ are the blend weights. In some examples, a parameter beta is a constant, meaning a standard body shape is used in IK model training and visualization.

In some examples, a calibration includes scaling up/down sensor readings to make the inputs consistent to model training.

In some examples, all joint locations J and rotations θ are provided to generate the full body shape, which is the forward kinematics.

In some examples, a user 442 wears AR glasses 450, EMF tracking sensor 444, and EMF tracking sensor 446 on their wrists. An EMF source 448 is located on the back of the head and has a fixed relative pose to the AR glasses 450. By coordinate transformations, body-tracking data 510 is generated from the EMF tracking data and/or IMU tracking data 436. The body-tracking data 510 comprises an absolute pose of the AR glasses 450 and of the two EMF tracking sensors in world coordinates. The AR glasses 450 are mapped to joint 15 504 of the 3D body model 502, one EMF tracking sensor is mapped to joint 20 506 and another EMF tracking sensor is mapped to joint 21 508. Accordingly, an IK problem can be formulated as T=ƒ({pj, θj}), j∈{15, 20, 21}, where pj and θ j are the positions and orientations of the three known body joints, and a function ƒ, represented in an IK model, is used to map the three joints to all 22 body joints.

The IK model comprises a linear embedding component 512, one or more transform encoder components 514, a world transition decoder 516 and a joint rotations decoder 518 and a forward kinematics component 520 operably connected to the joint rotations decoder 518. The pose tracking system uses the IK model to generate a 3D body model 502 based on the body-tracking data 510.

In some examples, depending on different use cases and computation resources, multiple machine learning based IK models are used. A light-weight per-frame IK model for upper body tracking is used by the upper body inverse kinematic component 422 (of FIG. 4A) and a multi-frame full body IK model is used by full body inverse kinematic component 424 (of FIG. 4A). In some user cases, users use upper body representations in XR and may prefer to run the models in real-time on the local device; therefore a light-weight machine learning model which is suitable for running on mobile devices in real-time is desirable. In this model, model inference efficiency and upper body IK accuracy are emphasized. Each frame is processed and produces the IK results rather than taking a sequence of frames as input, which incurs heavier pre-processing and model inference computation overhead. In this model, a global transition of the body is not considered and upper-body shape reconstruction is a focus. In some examples, a global transition is ignored by setting an origin at a head position, and taking relative poses of EMF tracking sensors to the head as input. As ground plane data of the ground plane may be determined from a VIO tracking system, height information is retained which helps on leg bending prediction. Assuming a head position is p={x,y, z} and an initial height of the AR glasses is y0, x and z transitions can be ignored and height y is normalized against the initial height y0, then the head position can be represented as p={0,y/y0, 0}.

Figure 6:
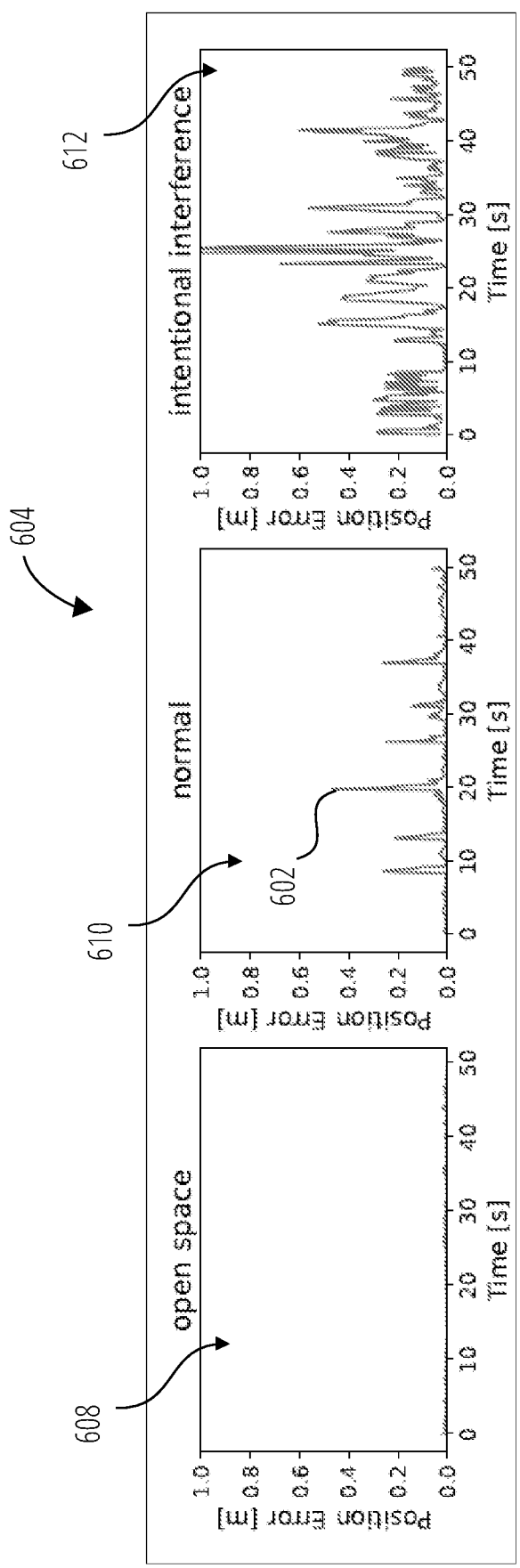
FIG. 6 is an illustration of errors introduced into a pose tracking system by metal interference, in accordance with some examples.

FIG. 6 is an illustration of error plots 604 of errors introduced into a pose tracking system by metal interference in accordance with some examples of the disclosure. In some examples, an IMU sensor is embedded together with an EMF receiver allowing for both interference detection and interference mitigation. There are multiple types of metal interference according to how the sensor moves around metal objects. On the one hand, if the sensor passes alongside a static metal object, a spike-like short period error 602 happens in the EMF tracking data. On the other hand, if a metal object and the EMF tracking sensor move around together, the errors last as long as they are in a close range. Both cases could happen in end-user scenarios: Users may move their arm near metal objects such as a laptop or a door, or hold a smartphone or a can while interacting with XR content. Thus, decomposing the problem into two parts is useful, for instance an interference detection part and an interference mitigation part. In some examples, a method of interference mitigation (i.e., correcting tracking errors under interference) targets short-period error where metal objects are placed statically in an environment and users encounter them occasionally while moving. This is because of a difficulty of tracking a pose over a long period from the EMF and IMU sensors under metal interference.

FIG. 6 shows sample error plots within a session in the three different conditions. From these plots, a trend of two different types of errors are observed. In the open space 608 and normal 610 conditions, the errors are mostly spike-like, meaning that the error parts occur for a short period, corresponding to the moments where the moving wrists get closer to the metal. On the other hand, large errors remain for several seconds in the intentional condition 612 when users hold or touch a metal object such as a can or a laptop. Both of these errors would occur in end-user environments and are considered.

Figure 7:
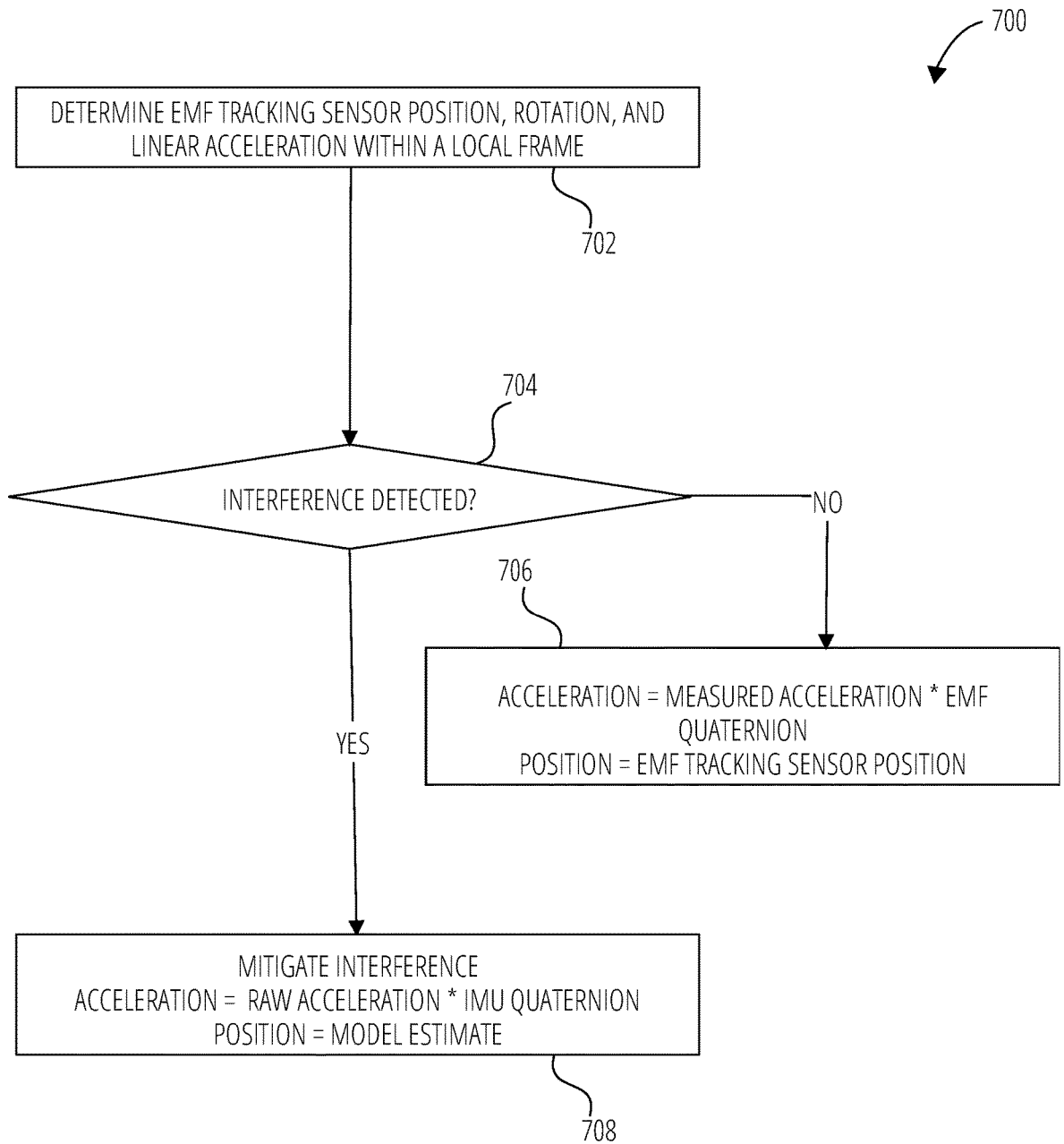
FIG. 7 is a process flow diagram of a method of metal interference detection and mitigation method, in accordance with some examples.

FIG. 7 is a process flow diagram of a method of metal interference detection and mitigation method 700 in accordance with some examples of the present disclosure. A pose tracking system uses the interference detection and mitigation method 700 to detect interference caused by metal objects in an operational environment of the pose tracking system. In operation 702, the pose tracking system determines EMF tracking sensor position, rotation, and linear acceleration within a local frame for one or more EMF tracking sensors, such as EMF tracking sensors 444 and 446 (of FIG. 4A). For instance, the pose tracking system determines an EMF quaternion based on EMF tracking data 430 (of FIG. 4A) and an IMU quaternion based on IMU tracking data 436 (of FIG. 4A).

In operation 704, the pose tracking system determines if there is metal interference with the measurements of the EMF tracking system 414 (of FIG. 4A) based on the EMF quaternion and the IMU quaternion. For example, while moving around the operational environment, an EMF tracking sensor streams two values regarding its orientation based on different principles: an angular momentum from gyroscopic sensor of an IMU and attitude angle from the EMF tracking sensor. Assuming an orientation in axis-angle representation $$\Phi_s EMF(t) \in R^{1 \times 3}$$

given time t when there is no metal interference. I (t) is used as a binary index to represent whether there is interference or not. At time t+Δt, orientation information from the EMF sensor is represented as $$\Phi_s EMF(t + \Delta t).$$

An approximation of the value as $$\Phi_s IMU(t+1) \sim \Phi_s EMF(t) + \Delta\Phi_s IMU(t) \times \Delta t,$$

where $$\Delta\Phi_s IMU(t)$$

is the angular momentum in the axis-angle representation in the same coordinate as $$\Phi_s EMF(t).$$

Then, an error threshold can be introduced, $$e\Phi_{th}$$

to estimate the interference state I (t+Δt) as, $$\hat{I}(t + \Delta t) = 1 \text{ if } d\left(\Phi_s IMU(t+1), \Phi_s EMF(t+1)\right) \geq e\Phi_{th}$$
$$0 \text{ if } d\left(\Phi_s IMU(t+1), \Phi_s EMF(t+1)\right) < e\Phi_{th}$$

where d means intrinsic geodesic distance between given two angles.

In operation 706, if the pose tracking system does not detect metal interference in operation 704, the pose tracking system uses the EMF tracking data without correction. For instance, the pose tracking system sets as an acceleration value of a node in a 3D body model as a measured acceleration of an EMF quaternion of a corresponding EMF tracking sensor and sets a position of the node of the 3D body model as a position of the corresponding EMF tracking sensor.

In operation 708, if the pose tracking system detects metal interference in operation 704, the pose tracking system corrects for the metal interference based on IMU tracking data 436. For example, the pose tracking system identifies moments where interference occurs and corrects the tracking within the moments. The error is corrected in real-time in order to develop a real-time body tracking system. For example if Î(t+Δt)=1, a correct value for the current position $$P_s EMF(t + \Delta t)$$

is generated using past tracking and sensor data until time t. Then, if there is still interference in t+2Δt, a position is corrected using the past data until t+Δt. This may lead to long term drift in the corrected values.

In some examples, IMU odometry data is used to correct the measured data. This method is a physics-based approach: given the initial velocity and a time series of acceleration from the IMU sensor, a position is obtained through dual integration:

$$x(t)=x(t0)+v(t0)*(t-t0)+\int_{t0}^{t}\int_{t0}^{\tau}a(\tau')d\tau'd\tau$$

where x (t), v (t), and a(t) represent position, velocity, and acceleration at time t, and t0 represents the initial time.

Figure 8:
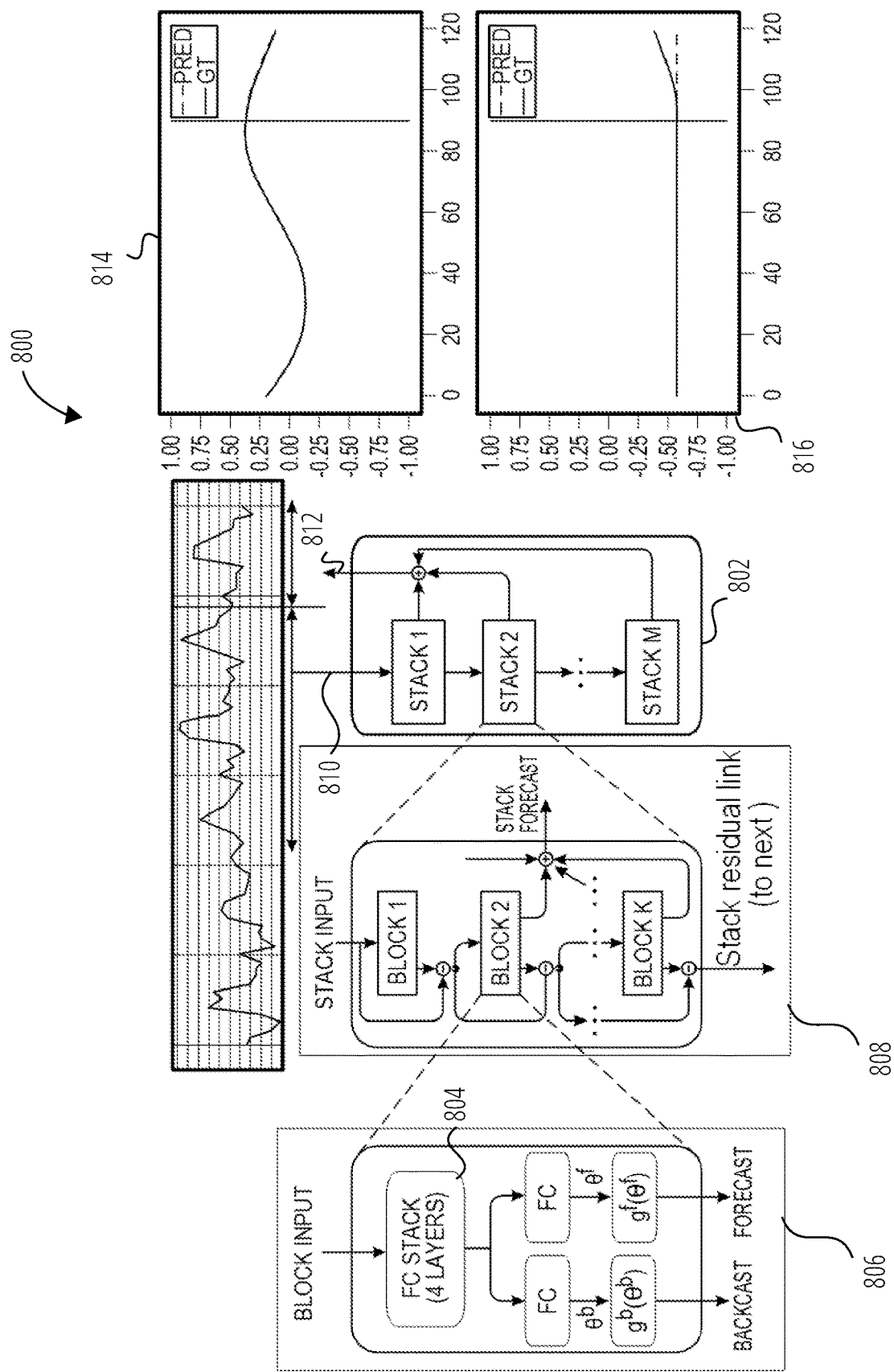
FIG. 8 illustrates an error correction method, in accordance with some examples.

FIG. 8 illustrates an EMF tracking data correction method 800 in accordance with some examples of the present disclosure. In some examples, a pose tracking system 412 (of FIG. 4A) uses previous EMF position tracking data history 810 to forecast future EMF position tracking data 812 of a future trajectory for a short period, which can be used for correcting EMF position tracking data under metal interference. For example, corrected EMF position tracking data is determined using AI methodologies and one or more trained models. The EMF tracking data correction method 800 leverages historical EMF position tracking data to generate the forecast trajectory and correct for errors caused by metal interference. The EMF tracking data correction method 800 uses deep machine learning models for time series forecasting. In some examples, the EMF tracking data correction method 800 utilizes a prediction model 802 having an N-BEATS architecture. The prediction model 802 comprises one or more stacks, such as stack 808, comprised of one or more blocks, such as block 806 comprised of one or more fully-connected layers 804. The prediction model 802 is trained (as more fully described in reference to FIG. 9 and FIG. 10) on representations of different components of a time series of EMF position tracking data, including trend, seasonality, and residual components as exemplified by the equation:

$$\{x(t0), \ldots ,x(t0+toutput)\}=\text{Prediction\_Model}(\{x(t0-tinput), \ldots ,x(t0)\})$$

where toutput and tinput correspond to how much future data the prediction model 802 outputs and how much previous data the prediction model 802 takes as inputs, respectively.

In some examples, the architecture of the prediction model 802 comprises backward and forward residual links.

The backward residual links model the residuals between the previous EMF position tracking data history 810 and the forecast future EMF position tracking data 812, while the forward links model the forecast itself. The residual links specifically help account for the errors induced in the EMF signal. By decomposing the time series into these different components, the EMF tracking data correction method 800 is able to make accurate forecasts by correcting errors in the predictions in real time.

Figure 9:
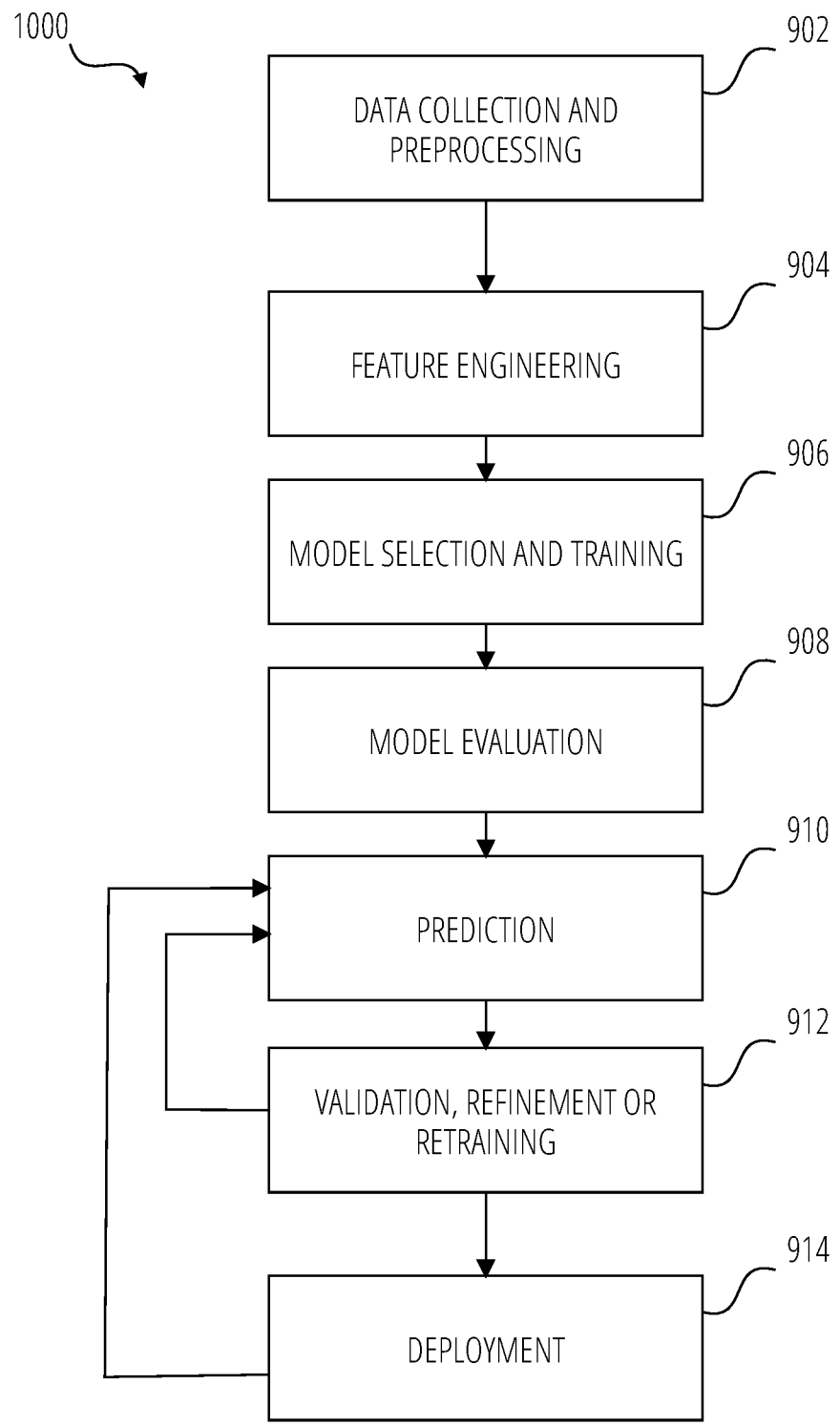
FIG. 9 illustrates a machine-learning pipeline, in accordance with some examples.
Figure 10:
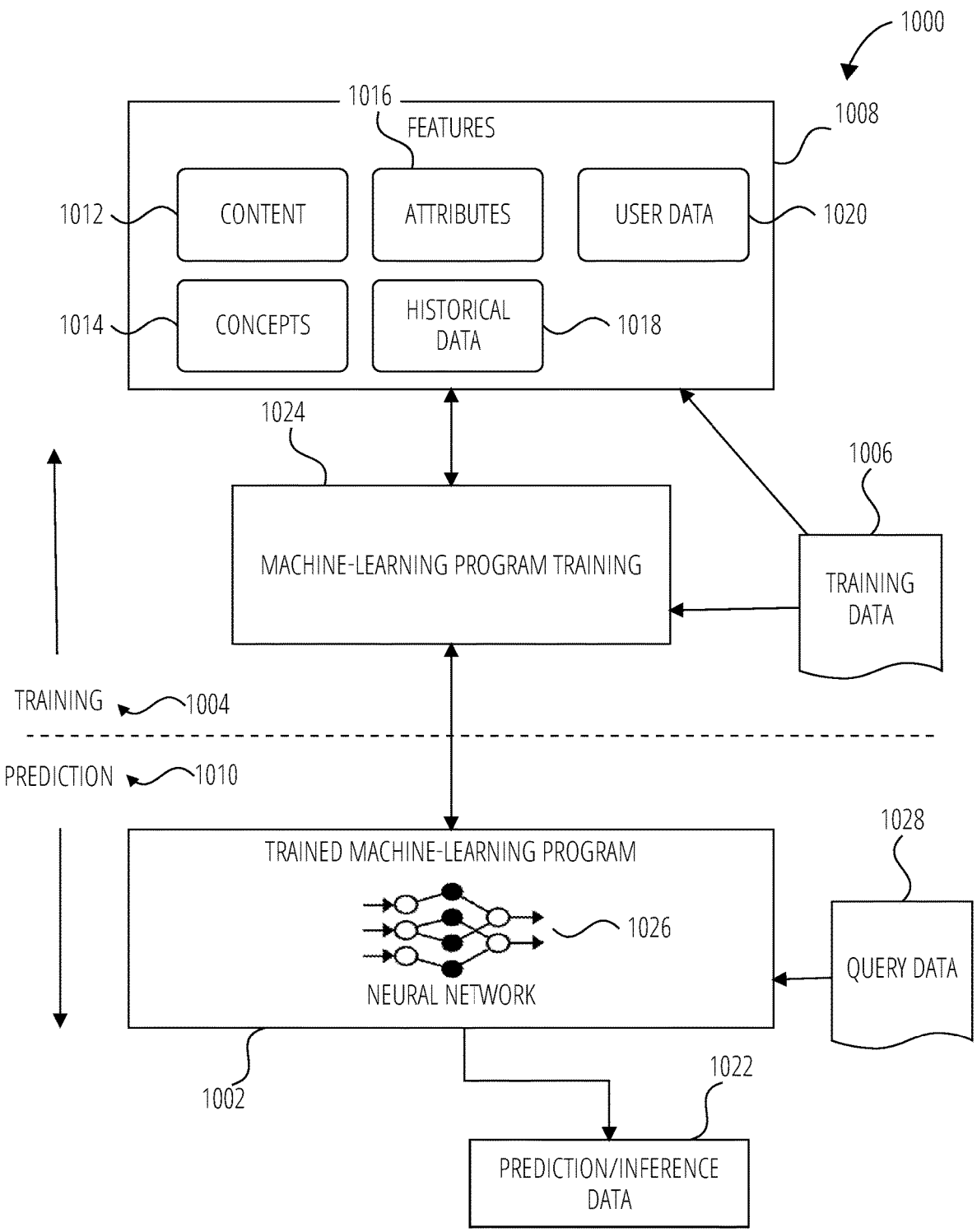
FIG. 10 illustrates training and use of a machine-learning program, in accordance with some examples.

In some examples, the prediction model 802 is trained by minimizing a loss function that compares the forecast to the actual values for a window of time into the future as more fully described in reference to FIG. 9 and FIG. 10.

In some implementations, a prediction model may work well when there is not an acceleration component to the previous EMF position tracking data history 810, as shown in predicted EMF tracking data vs. actual ground truth EMF tracking data with not acceleration graph 814, but may have difficulty predicting accurate predicted EMF tracking data as illustrated by predicted EMF tracking data vs. actual ground truth EMF tracking data with acceleration graph 816. In some examples, a fusion model is used to correct the EMF tracking data. For example, to determine future acceleration while avoiding the error due to noisy v (t0), a trajectory is approximated as follows: x (t0+Δt)=PredictionModel({x (t0−tinput), . . . , x (t0)})t0+Δt+a(t0)×Δt, for instance the prediction model 802 model is used in an iterative manner. The model outputs toutput seconds estimation, a single prediction value corresponding to time t0+Δt is used. After the acceleration component is added to it, the pose tracking system uses the value as the input to the prediction model 802 inference for the next step if there is still metal interference. In this way, the pose tracking system can correct the prediction model 802 prediction by adding an acceleration component, which further influences the subsequent trajectory prediction.

In some examples, an IK model is trained using a large human motion database AMASS (Archive of Motion Capture as Surface Shapes) that contains a collection of existing optical tracking based high precision MoCap datasets. Specifically, a model training system uses a combination of CMU, Eyes_Japan, KIT, MPI_HDM05 and TotalCapture datasets as training set, the model training system uses MPI_Limits as validation set and ACCAD and MPI_mosh as test set. In total, the model training system uses 88,519 training samples, 1182 validation samples and 2244 test samples. For full-body model training, the model training system down-samples the MoCap dataset from 120 Hz to 60 Hz, and generates windowed segments of 40 frames (i.e., ⅔ second window) with a stride length of 0.1 second. To train the IK model, the model training system uses Adam solver with batch size of 32 and a starting learning rate of 0.001 and decays by a factor of 0.8 every 20 epochs. The model training system trains a model with PyTorch on Google Cloud Platforms with NVIDIA Tesla V100 GPU.

In some examples, a pose tracking system detects interference and a user is informed of lower body tracking performance. For example, if a user holds a smartphone that causes an interference with the pose tracking system, the pose tracking system notifies the user via AR glasses that the tracking performance is low due to the fact that the metal object is close to the sensor. Such a remedy is helpful for better user experiences.

Machine-Learning Pipeline 1000

FIG. 10 is a flowchart depicting a machine-learning pipeline 1000, according to some examples. The machine-learning pipeline 200 may be used to generate a trained model, for example the trained machine-learning program 1002 of FIG. 10, to perform operations associated with searches and query responses. Example models used by the pose tracking system 412 (of FIG. 4A) include, but are not limited to, inverse kinematics models, upper-body reconstruction models, prediction models, and the like.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Training Phases 1004

Generating a trained machine-learning program 1002 may include multiple phases that form part of the machine-learning pipeline 1000, including for example the following phases illustrated in FIG. 9:

Data collection and preprocessing 902: This phase may include acquiring and cleaning data to ensure that it is suitable for use in the machine learning model. This phase may also include removing duplicates, handling missing values, and converting data into a suitable format.

Feature engineering 904: This phase may include selecting and transforming the training data 1006 to create features that are useful for predicting the target variable. Feature engineering may include (1) receiving features 1008 (e.g., as structured or labeled data in supervised learning) and/or (2) identifying features 1008 (e.g., unstructured or unlabeled data for unsupervised learning) in training data 1006.

Model selection and training 906: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 908: This phase may include evaluating the performance of a trained model (e.g., the trained machine-learning program 1002) on a separate testing dataset. This phase can help determine if the model is overfitting or underfitting and determine whether the model is suitable for deployment.

Prediction 910: This phase involves using a trained model (e.g., trained machine-learning program 1002) to generate predictions on new, unseen data.

Validation, refinement or retraining 912: This phase may include updating a model based on feedback generated from the prediction phase, such as new data or user feedback.

Deployment 914: This phase may include integrating the trained model (e.g., the trained machine-learning program 1002) into a more extensive system or application, such as a web service, mobile app, or IoT device. This phase can involve setting up APIs, building a user interface, and ensuring that the model is scalable and can handle large volumes of data.

FIG. 10 illustrates further details of two example phases, namely a training phase 1004 (e.g., part of the model selection and trainings 906) and a prediction phase 1010 (part of prediction 910). Prior to the training phase 1004, feature engineering 904 is used to identify features 1008. This may include identifying informative, discriminating, and independent features for effectively operating the trained machine-learning program 1002 in pattern recognition, classification, and regression. In some examples, the training data 1006 includes labeled data, known for pre-identified features 1008 and one or more outcomes. Each of the features 1008 may be a variable or attribute, such as an individual measurable property of a process, article, system, or phenomenon represented by a data set (e.g., the training data 1006). Features 1008 may also be of different types, such as numeric features, strings, and graphs, and may include one or more of content 1012, concepts 1014, attributes 1016, historical data 1018, and/or user data 1020, merely for example.

In training phase 1004, the machine-learning pipeline 1000 uses the training data 1006 to find correlations among the features 1008 that affect a predicted outcome or prediction/inference data 1022.

With the training data 1006 and the identified features 1008, the trained machine-learning program 1002 is trained during the training phase 1004 during machine-learning program training 1024. The machine-learning program training 1024 appraises values of the features 1008 as they correlate to the training data 1006. The result of the training is the trained machine-learning program 1002 (e.g., a trained or learned model).

Further, the training phase 1004 may involve machine learning, in which the training data 1006 is structured (e.g., labeled during preprocessing operations). The trained machine-learning program 1002 implements a neural network 1026 capable of performing, for example, classification and clustering operations. In other examples, the training phase 1004 may involve deep learning, in which the training data 1006 is unstructured, and the trained machine-learning program 1002 implements a deep neural network 1026 that can perform both feature extraction and classification/clustering operations.

In some examples, a neural network 226 may be generated during the training phase 1004, and implemented within the trained machine-learning program 1002. The neural network 1026 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1026 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1026 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1004, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 1010, the trained machine-learning program 1002 uses the features 1008 for analyzing query data 1028 to generate inferences, outcomes, or predictions, as examples of a prediction/inference data 1022. For example, during prediction phase 1010, the trained machine-learning program 1002 generates an output. Query data 1028 is provided as an input to the trained machine-learning program 1002, and the trained machine-learning program 1002 generates the prediction/inference data 1022 as output, responsive to receipt of the query data 1028.

In some examples, the trained machine-learning program 1002 may be a generative AI model. Generative AI is a term that may refer to any type of artificial intelligence that can create new content from training data 1006. For example, generative AI can produce text, images, video, audio, code, or synthetic data similar to the original data but not identical.

Some of the techniques that may be used in generative AI are:
- Convolutional Neural Networks (CNNs): CNNs may be used for image recognition and computer vision tasks. CNNs may, for example, be designed to extract features from images by using filters or kernels that scan the input image and highlight important patterns.
- Recurrent Neural Networks (RNNs): RNNs may be used for processing sequential data, such as speech, text, and time series data, for example. RNNs employ feedback loops that allow them to capture temporal dependencies and remember past inputs.
- Generative adversarial networks (GANs): GNNs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the output prediction/inference data 222 include predictions, translations, summaries or media content.

Figure 11:
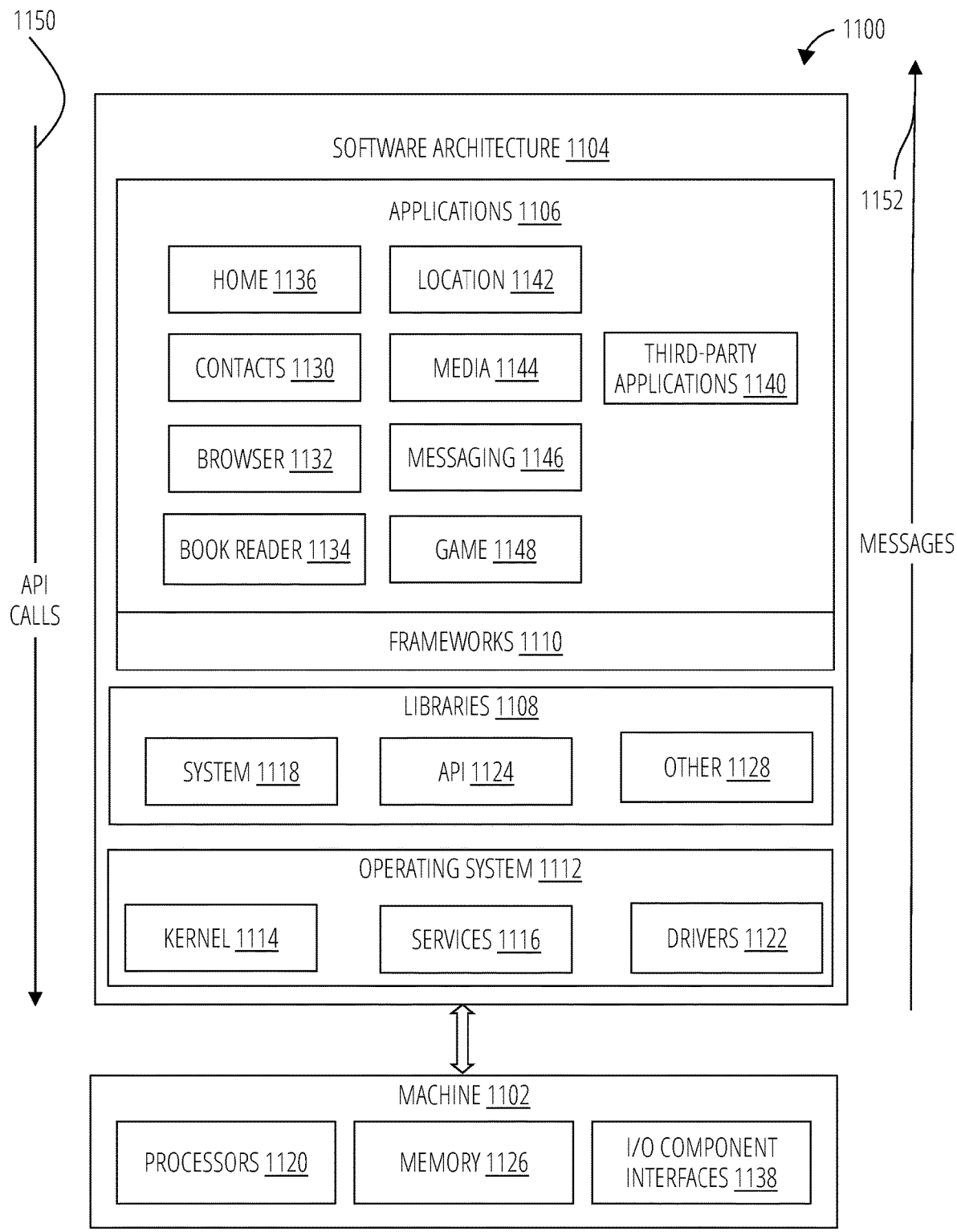
FIG. 11 is a block diagram showing a software architecture within which the present disclosure may be implemented, in accordance with some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O component interfaces 1138. In this example, the software architecture 1104 can be conceptualized as a stack of layers, where individual layers provide a particular functionality. The software architecture 1104 includes layers such as an operating system 1112, libraries 1108, frameworks 1110, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1108 provide a low-level common infrastructure used by the applications 1106. The libraries 1108 can include system libraries 1118 (e.g., C standard library) that provide functions such as memory allocation functions, string manipulation functions, mathematic functions, and the like. In addition, the libraries 1108 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1108 can also include a wide variety of other libraries 1128 to provide many other APIs to the applications 1106.

The frameworks 1110 provide a high-level common infrastructure that is used by the applications 1106. For example, the frameworks 1110 provide various graphical user interface (GUI) functions, high-level resource management, and high-level location services. The frameworks 1110 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as third-party applications 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party applications 1140 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1140 can invoke the API calls 1150 provided by the operating system 1112 to facilitate functionality described herein.

Figure 12:
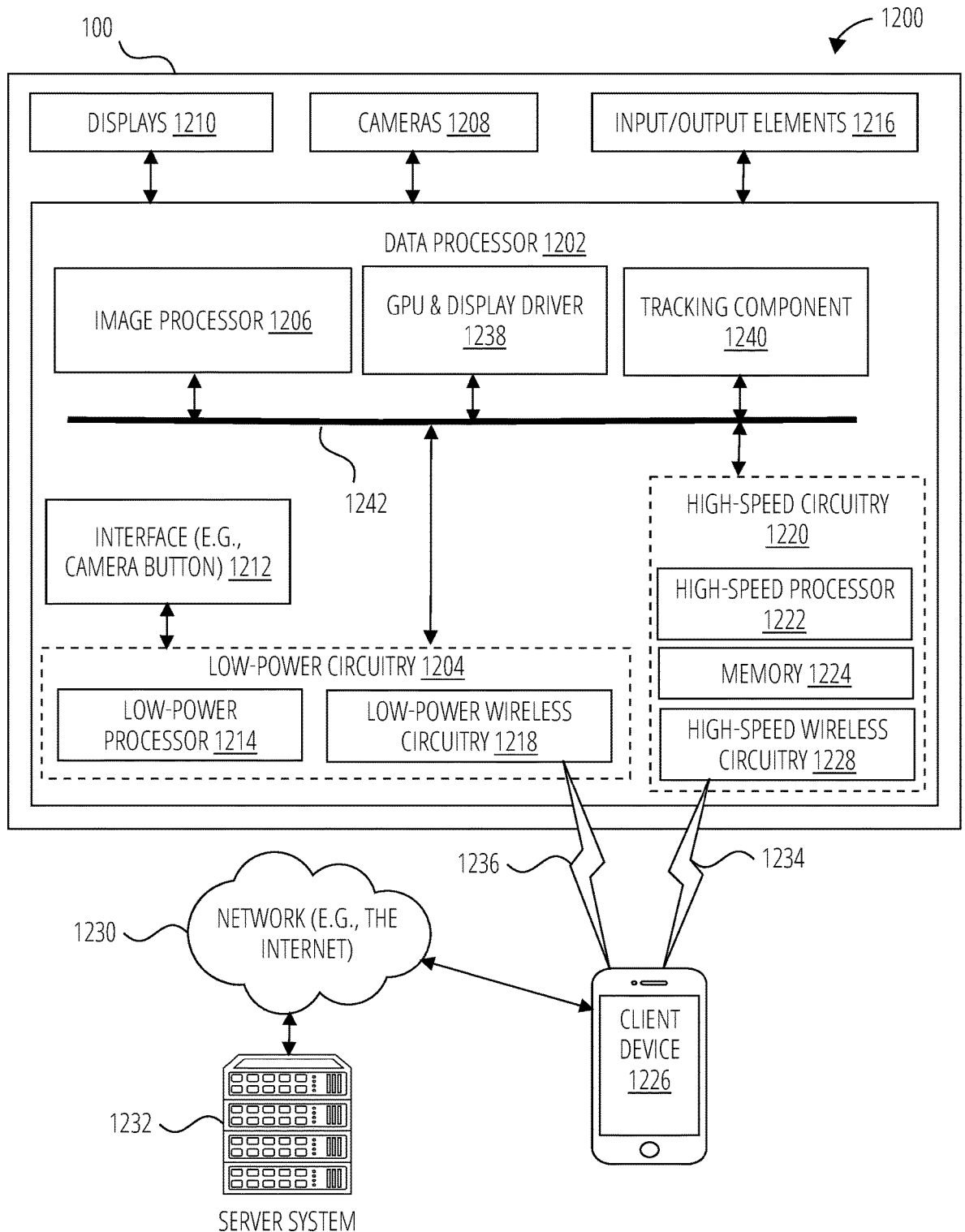
FIG. 12 is a block diagram illustrating a networked system including details of a head-worn XR or AR system, in accordance with some examples.

FIG. 12 is a block diagram illustrating a networked system 1200 including details of the glasses 100, in accordance with some examples. The networked system 1200 includes the glasses 100, a client device 1226, and a server system 1232. The client device 1226 may be a smartphone, tablet, phablet, laptop computer, access point, or any other such device capable of connecting with the glasses 100 using a low-power wireless connection 1236 and/or a high-speed wireless connection 1234. The client device 1226 is connected to the server system 1232 via the network 1230. The network 1230 may include any combination of wired and wireless connections. The server system 1232 may be one or more computing devices as part of a service or network computing system. The client device 1226 and any elements of the server system 1232 and network 1230 may be implemented using details of the software architecture 1104 or the machine 300 described in FIG. 11 and FIG. 3 respectively.

The glasses 100 include a data processor 1202, displays 1210, one or more cameras 1208, and additional input/output elements 1216. The input/output elements 1216 may include microphones, audio speakers, biometric sensors, additional sensors, or additional display elements integrated with the data processor 1202. Examples of the input/output elements 1216 are discussed further with respect to FIG. 11 and FIG. 3. For example, the input/output elements 1216 may include any of I/O device interfaces 306 including output component interfaces 328, motion component interfaces 336, and so forth. Examples of the displays 1210 are discussed in FIG. 2. In the particular examples described herein, the displays 1210 include a display for the user's left and right eyes.

The data processor 1202 includes an image processor 1206 (e.g., a video processor), a GPU & display driver 1238, a tracking component 1240, an interface 1212, low-power circuitry 1204, and high-speed circuitry 1220. The components of the data processor 1202 are interconnected by a bus 1242.

The interface 1212 refers to any source of a user command that is provided to the data processor 1202. In one or more examples, the interface 1212 is a physical button that, when depressed, sends a user input signal from the interface 1212 to a low-power processor 1214. A depression of such button followed by an immediate release may be processed by the low-power processor 1214 as a request to capture a single image, or vice versa. A depression of such a button for a first period of time may be processed by the low-power processor 1214 as a request to capture video data while the button is depressed, and to cease video capture when the button is released, with the video captured while the button was depressed stored as a single video file. Alternatively, depression of a button for an extended period of time may capture a still image. In some examples, the interface 1212 may be any mechanical switch or physical interface capable of accepting user inputs associated with a request for data from the cameras 1208. In other examples, the interface 1212 may have a software component, or may be associated with a command received wirelessly from another source, such as from the client device 1226.

The image processor 1206 includes circuitry to receive signals from the cameras 1208 and process those signals from the cameras 1208 into a format suitable for storage in the memory 1224 or for transmission to the client device 1226. In one or more examples, the image processor 1206 (e.g., video processor) comprises a microprocessor integrated circuit (IC) customized for processing sensor data from the cameras 1208, along with volatile memory used by the microprocessor in operation.

The low-power circuitry 1204 includes the low-power processor 1214 and the low-power wireless circuitry 1218. These elements of the low-power circuitry 1204 may be implemented as separate elements or may be implemented on a single IC as part of a system on a single chip. The low-power processor 1214 includes logic for managing the other elements of the glasses 100. As described above, for example, the low-power processor 1214 may accept user input signals from the interface 1212. The low-power processor 1214 may also be configured to receive input signals or instruction communications from the client device 1226 via the low-power wireless connection 1236. The low-power wireless circuitry 1218 includes circuit elements for implementing a low-power wireless communication system. Bluetooth™ Smart, also known as Bluetooth™ low energy, is one standard implementation of a low power wireless communication system that may be used to implement the low-power wireless circuitry 1218. In other examples, other low power communication systems may be used.

The high-speed circuitry 1220 includes a high-speed processor 1222, a memory 1224, and a high-speed wireless circuitry 1228. The high-speed processor 1222 may be any processor capable of managing high-speed communications and operation of any general computing system used for the data processor 1202. The high-speed processor 1222 includes processing resources used for managing high-speed data transfers on the high-speed wireless connection 1234 using the high-speed wireless circuitry 1228. In some examples, the high-speed processor 1222 executes an operating system such as a LINUX operating system or other such operating system such as the operating system 1112 of FIG. 11. In addition to any other responsibilities, the high-speed processor 1222 executing a software architecture for the data processor 1202 is used to manage data transfers with the high-speed wireless circuitry 1228. In some examples, the high-speed wireless circuitry 1228 is configured to implement Institute of Electrical and Electronic Engineers (IEEE) 802.11 communication standards, also referred to herein as Wi-Fi. In other examples, other high-speed communications standards may be implemented by the high-speed wireless circuitry 1228.

The memory 1224 includes any storage device capable of storing camera data generated by the cameras 1208 and the image processor 1206. While the memory 1224 is shown as integrated with the high-speed circuitry 1220, in other examples, the memory 1224 may be an independent stand-alone element of the data processor 1202. In some such examples, electrical routing lines may provide a connection through a chip that includes the high-speed processor 1222 from image processor 1206 or the low-power processor 1214 to the memory 1224. In other examples, the high-speed processor 1222 may manage addressing of the memory 1224 such that the low-power processor 1214 will boot the high-speed processor 1222 any time that a read or write operation involving the memory 1224 is desired.

The tracking component 1240 estimates a pose of the glasses 100. For example, the tracking component 1240 uses image data and associated inertial data from the cameras 1208 and the position component interfaces 340, as well as GPS data, to track a location and determine a pose of the glasses 100 relative to a frame of reference (e.g., real-world scene environment). The tracking component 1240 continually gathers and uses updated sensor data describing movements of the glasses 100 to determine updated three-dimensional poses of the glasses 100 that indicate changes in the relative position and orientation relative to physical objects in the real-world scene environment. The tracking component 1240 permits visual placement of virtual objects relative to physical objects by the glasses 100 within the field of view of the user via the displays 1210.

The GPU & display driver 1238 may use the pose of the glasses 100 to generate frames of virtual content or other content to be presented on the displays 1210 when the glasses 100 are functioning in a traditional augmented reality mode. In this mode, the GPU & display driver 1238 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 1226, or on a remote server. For example, one or more functions or operations described herein may be performed by one of the applications 1106 such as messaging application 1146.

Figure 13:
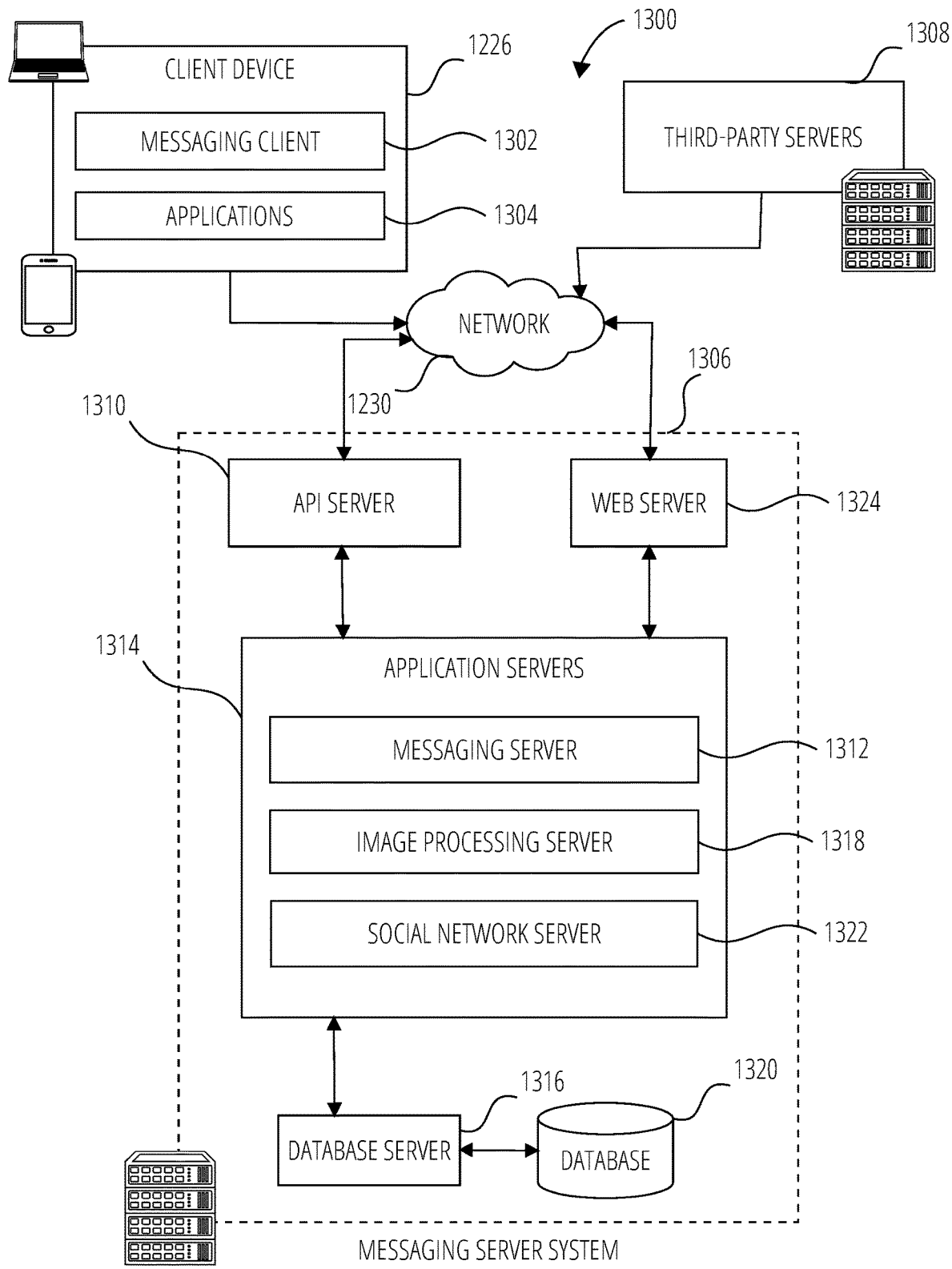
FIG. 13 is a block diagram showing an example messaging system for exchanging data (e.g., messages and associated content) over a network, in accordance with some examples.

FIG. 13 is a block diagram showing an example messaging system 1300 for exchanging data (e.g., messages and associated content) over a network. The messaging system 1300 includes multiple instances of a client device 1226 which host a number of applications, including a messaging client 1302 and other applications 1304. A messaging client 1302 is communicatively coupled to other instances of the messaging client 1302 (e.g., hosted on respective other client devices 1226), a messaging server system 1306 and third-party servers 1308 via a network 1230 (e.g., the Internet). A messaging client 1302 can also communicate with locally hosted applications 1304 using Application Program Interfaces (APIs).

A messaging client 1302 is able to communicate and exchange data with other messaging clients 1302 and with the messaging server system 1306 via the network 1230. The data exchanged between messaging clients 1302, and between a messaging client 1302 and the messaging server system 1306, includes functions (e.g., commands to invoke functions) as well as payload data (e.g., text, audio, video or other multimedia data).

The messaging server system 1306 provides server-side functionality via the network 1230 to a particular messaging client 1302. While some functions of the messaging system 1300 are described herein as being performed by either a messaging client 1302 or by the messaging server system 1306, the location of some functionality either within the messaging client 1302 or the messaging server system 1306 may be a design choice. For example, it may be technically preferable to initially deploy some technology and functionality within the messaging server system 1306 but to later migrate this technology and functionality to the messaging client 1302 where a client device 1226 has sufficient processing capacity.

The messaging server system 1306 supports various services and operations that are provided to the messaging client 1302. Such operations include transmitting data to, receiving data from, and processing data generated by the messaging client 1302. This data may include message content, client device information, geolocation information, media augmentation and overlays, message content persistence conditions, social network information, and live event information, as examples. Data exchanges within the messaging system 1300 are invoked and controlled through functions available via user interfaces (UIs) of the messaging client 1302.

Turning now specifically to the messaging server system 1306, an Application Program Interface (API) server 1310 is coupled to, and provides a programmatic interface to, application servers 1314. The application servers 1314 are communicatively coupled to a database server 1316, which facilitates access to a database 1320 that stores data associated with messages processed by the application servers 1314. Similarly, a web server 1324 is coupled to the application servers 1314, and provides web-based interfaces to the application servers 1314. To this end, the web server 1324 processes incoming network requests over the Hypertext Transfer Protocol (HTTP) and several other related protocols.

The Application Program Interface (API) server 1310 receives and transmits message data (e.g., commands and message payloads) between the client device 1226 and the application servers 1314. Specifically, the Application Program Interface (API) server 1310 provides a set of interfaces (e.g., routines and protocols) that can be called or queried by the messaging client 1302 in order to invoke functionality of the application servers 1314. The Application Program Interface (API) server 1310 exposes various functions supported by the application servers 1314, including account registration, login functionality, the sending of messages, via the application servers 1314, from a particular messaging client 1302 to another messaging client 1302, the sending of media files (e.g., images or video) from a messaging client 1302 to a messaging server 1312, and for possible access by another messaging client 1302, the settings of a collection of media data (e.g., story), the retrieval of a list of friends of a user of a client device 1226, the retrieval of such collections, the retrieval of messages and content, the addition and deletion of entities (e.g., friends) to an entity graph (e.g., a social graph), the location of friends within a social graph, and opening an application event (e.g., relating to the messaging client 1302).

The application servers 1314 host a number of server applications and subsystems, including for example a messaging server 1312, an image processing server 1318, and a social network server 1322. The messaging server 1312 implements a number of message processing technologies and functions, particularly related to the aggregation and other processing of content (e.g., textual and multimedia content) included in messages received from multiple instances of the messaging client 1302. As will be described in further detail, the text and media content from multiple sources may be aggregated into collections of content (e.g., called stories or galleries). These collections are then made available to the messaging client 1302. Other processor and memory intensive processing of data may also be performed server-side by the messaging server 1312, in view of the hardware requirements for such processing.

The application servers 1314 also include an image processing server 1318 that is dedicated to performing various image processing operations, typically with respect to images or video within the payload of a message sent from or received at the messaging server 1312.

The social network server 1322 supports various social networking functions and services and makes these functions and services available to the messaging server 1312. To this end, the social network server 1322 maintains and accesses an entity graph within the database 1320. Examples of functions and services supported by the social network server 1322 include the identification of other users of the messaging system 1300 with which a particular user has relationships or is "following," and also the identification of other entities and interests of a particular user.

The messaging client 1302 can notify a user of the client device 1226, or other users related to such a user (e.g., "friends"), of activity taking place in shared or shareable sessions. For example, the messaging client 1302 can provide participants in a conversation (e.g., a chat session) in the messaging client 1302 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Additional examples include:

Example 1 is a computer-implemented method comprising: determining, by one or more processors, using an Electromagnetic Field (EMF) tracking system, EMF tracking data of one or more wrists of a user; determining, by the one or more processors, using a Visual Inertial Odometry (VIO) tracking system, VIO tracking data of the head of the user; determining, by the one or more processors, head pose data of the head of the user and wrist pose data of the one or more wrists of the user based on the EMF tracking data and the VIO tracking data; generating, by the one or more processors, 3D body model data of the user based on the head and wrist pose data; and communicating, by the one or more processors, the 3D body model data to an Augmented Reality (AR) application for use in an AR user interface for the user.

In Example 2, the subject matter of Example 1 includes, wherein determining the head and wrist pose data further comprises: determining Inertial Measurement Unit (IMU) tracking data of one or more EMF tracking sensors of the EMF tracking system; detecting interference in the EMF tracking data based on the EMF tracking data; and correcting the EMF tracking data based on the IMU tracking data.

In Example 3, the subject matter of any of Examples 1-2 includes, determining IMU tracking data of one or more EMF tracking sensors of the EMF tracking system; and correcting long-term drift in the IMU tracking data using the EMF tracking data.

In Example 4, the subject matter of any of Examples 1-3 includes, wherein the EMF tracking system includes one or more wrist-mountable EMF tracking sensors, and the EMF tracking data is determined from the one or more wrist-mountable EMF tracking sensors.

In Example 5, the subject matter of any of Example 1-4 includes, wherein the EMF tracking system further includes a head-mounted EMF source in a fixed relationship to the VIO tracking system, and wherein the wrist pose data is determined based on a pose of the VIO tracking system and a relative pose of the one wrist-mountable EMF tracking sensors.

In Example 6, the subject matter of any of Examples 1-5 includes, determining, by the one or more processors, ground plane data based on the VIO tracking data; and generating the 3D body model data is further based on the ground plane data.

In Example 7, the subject matter of any of Examples 1-6 includes, correcting, by the one or more processors, the EMF tracking data using a previous EMF position tracking data history.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
   determining, by one or more processors, using a first Electromagnetic Field (EMF) tracking sensor, first EMF tracking data of a first wrist of a user;
   determining, by the one or more processors, using a second EMF tracking sensor, second EMF tracking data of a second wrist of the user;
   determining, by the one or more processors, using a Visual Inertial Odometry (VIO) tracking system, VIO tracking data of a head of the user;
   determining, by the one or more processors, head pose data of the head of the user based on the VIO tracking data;
   determining, by the one or more processors, first wrist pose data of the first wrist using the first EMF tracking data;
   determining, by the one or more processors, second wrist pose data of the second wrist using the second EMF tracking data;
   mapping, by the one or more processors, the head pose data to a first joint in a 3D body model, the first wrist pose data to a second joint of the 3D body model, and the second wrist pose data to a third joint of the 3D body model;
   generating, by the one or more processors, full 3D body model data of the user based on the first joint, the second joint, the third joint, and an Inverse Kinematic (IK) model, the full 3D body model data including a full body pose of the user; and
   communicating, by the one or more processors, the 3D body model data to an extended Reality (XR) application for use in an XR user interface for the user.

2. The computer-implemented method of claim 1, wherein determining the head and wrist pose data further comprises:
   determining Inertial Measurement Unit (IMU) tracking data of the first EMF tracking sensor and the second EMF tracking sensor;
   detecting interference in the EMF tracking data based on the EMF tracking data; and
   correcting the EMF tracking data based on the IMU tracking data.

3. The computer-implemented method of claim 2, further comprising:
   determining IMU tracking data of the first EMF tracking sensor and the second EMF tracking sensor; and
   correcting long-term drift in the IMU tracking data using the EMF tracking data.

4. The computer-implemented method of claim 1, wherein an EMF tracking system includes the first EMF tracking sensor, the second EMF tracking sensor, and a head-mounted EMF source in a fixed relationship to the VIO tracking system, and wherein the first wrist pose data and the second wrist pose data is determined based on a pose of the VIO tracking system and a relative pose of the first EMF tracking sensor and the second EMF tracking sensor.

5. The computer-implemented method of claim 1, further comprising:

determining, by the one or more processors, ground plane data based on the VIO tracking data; and
generating the 3D body model data is further based on the ground plane data.

6. The computer-implemented method of claim 1, further comprising:
correcting, by the one or more processors, the EMF tracking data using a previous EMF position tracking data history.

7. The computer-implemented method of claim 6, wherein correcting the EMF tracking data comprises using a Machine Learning (ML) for time series forecasting.

8. A machine, comprising:
one or more processors; and
one or more memories storing instructions that, when executed by the one or more processors, cause the machine to perform operations comprising:
determining, using a first Electromagnetic Field (EMF) tracking sensor, first EMF tracking data of a first wrist of a user;
determining, using a second EMF tracking sensor, second EMF tracking data of a second wrist of the user;
determining, using a Visual Inertial Odometry (VIO)-tracking system, VIO tracking data of a head of the user;
determining head pose data of the head of the user based on the VIO tracking data;
determining first wrist pose data of the first wrist using the first EMF tracking data;
determining second wrist pose data of the second wrist using the second EMF tracking data;
mapping the head pose data to a first joint in a 3D body model, the first wrist pose data to a second joint of the 3D body model, and the second wrist pose data to a third joint of the 3D body model;
generating full 3D body model data of the user based on the head and wrist pose data the first joint, the second joint, the third joint, and an Inverse Kinematic (IK) model, the full 3D body model data including a full body pose of the user; and
communicating the 3D body model data to an extended Reality (XR) application for use in an XR user interface for the user.

9. The machine of claim 8, wherein determining the head and wrist pose data further comprises:
determining Inertial Measurement Unit (IMU) tracking data of the first EMF tracking sensor and the second EMF tracking sensor;
detecting interference in the EMF tracking data based on the EMF tracking data; and
correcting the EMF tracking data based on the IMU tracking data.

10. The machine of claim 9, wherein the operations further comprise:
determining IMU tracking data of the first EMF tracking sensor and the second EMF tracking sensor; and
correcting long-term drift in the IMU tracking data using the EMF tracking data.

11. The machine of claim 8, wherein an EMF tracking system further includes the first EMF tracking sensor, the second EMF tracking sensor, and a head-mounted EMF source in a fixed relationship to the VIO tracking system, and wherein the first wrist pose data and the second wrist pose data is determined based on a pose of the VIO tracking system and a relative pose of the first EMF tracking sensor and the second EMF tracking sensor.

12. The machine of claim 8, wherein the operations further comprise:
determining, by the one or more processors, ground plane data based on the VIO tracking data; and
generating the 3D body model data is further based on the ground plane data.

13. The machine of claim 8, wherein the operations further comprise:
correcting, by the one or more processors, the EMF tracking data using a previous EMF position tracking data history.

14. The machine of claim 13, wherein correcting the EMF tracking data comprises using a Machine Learning (ML) for time series forecasting.

15. A machine-storage medium storing instructions that, when executed by one or more processors of a machine, cause the machine to perform operations comprising:
determining, using a first Electromagnetic Field (EMF) tracking sensor, first EMF tracking data of a first wrist of a user;
determining, using a second EMF tracking sensor, second EMF tracking data of a second wrist of the user;
determining, using a Visual Inertial Odometry (VIO)-tracking system, VIO tracking data of a head of the user;
determining head pose data of the head of the user based on the VIO tracking data;
determining first wrist pose data of the first wrist using the first EMF tracking data;
determining second wrist pose data of the second wrist using the second EMF tracking data;
mapping the head pose data to a first joint in a 3D body model, the first wrist pose data to a second joint of the 3D body model, and the second wrist pose data to a third joint of the 3D body model;
generating full 3D body model data of the user based on the head and wrist pose data the first joint, the second joint, the third joint, and an Inverse Kinematic (IK) model, the full 3D body model data including a full body pose of the user; and
communicating the 3D body model data to an extended Reality (XR) application for use in an XR user interface for the user.

16. The machine-storage medium of claim 15, wherein determining the head and wrist pose data further comprises:
determining Inertial Measurement Unit (IMU) tracking data of the first EMF tracking sensor and the second EMF tracking sensor;
detecting interference in the EMF tracking data based on the EMF tracking data; and
correcting the EMF tracking data based on the IMU tracking data.

17. The machine-storage medium of claim 16, wherein the operations further comprise:
determining IMU tracking data of the first EMF tracking sensor and the second EMF tracking sensor; and
correcting long-term drift in the IMU tracking data using the EMF tracking data.

18. The machine-storage medium of claim 15, wherein an EMF tracking system includes the first EMF tracking sensor, the second EMF tracking sensor, and a head-mounted EMF source in a fixed relationship to the VIO tracking system, and wherein the first wrist pose data and the second wrist pose data is determined based on a pose of the VIO tracking system and a relative pose of the first EMF tracking sensor and the second EMF tracking sensor.

19. The machine-storage medium of claim 15, wherein the operations further comprise:
- determining, by the one or more processors, ground plane data based on the VIO tracking data; and
- generating the 3D body model data is further based on the ground plane data.

20. The machine-storage medium of claim 15, wherein the operations further comprise:
- correcting the EMF tracking data using a previous EMF position tracking data history using a Machine Learning (ML) for time series forecasting.

* * * * *